(12) United States Patent
Yu et al.

(10) Patent No.: US 11,762,418 B2
(45) Date of Patent: Sep. 19, 2023

(54) FOLDABLE DEVICE

(71) Applicant: LENOVO (SINGAPORE) PTE. LTD, Singapore (SG)

(72) Inventors: Jonathan Yu, Raleigh, NC (US); Jeffrey E. Skinner, Raleigh, NC (US); Alden Rose, Durham, NC (US); Hallie MacEldowney, Raleigh, NC (US); Aaron M. Stewart, Raleigh, NC (US)

(73) Assignee: LENOVO (SINGAPORE) PTE. LTD, Singapore (SG)

(*) Notice: Subject to any disclaimer, the term of this patent is extended or adjusted under 35 U.S.C. 154(b) by 0 days.

(21) Appl. No.: 17/491,754

(22) Filed: Oct. 1, 2021

(65) Prior Publication Data

US 2023/0108323 A1   Apr. 6, 2023

(51) Int. Cl.
*G06F 1/16* (2006.01)

(52) U.S. Cl.
CPC .......... *G06F 1/1616* (2013.01); *G06F 1/1681* (2013.01); *G06F 2200/1614* (2013.01); *G06F 2203/04803* (2013.01)

(58) Field of Classification Search
CPC .. H04M 1/0268; G06F 1/1641; G06F 1/1652; G06F 1/1677; G06F 3/04886; G06F 2200/1614; G06F 2203/04803
See application file for complete search history.

(56) References Cited

U.S. PATENT DOCUMENTS

| | | | | |
|---|---|---|---|---|
| 5,847,698 A * | 12/1998 | Reavey | ............... | G06F 15/0283 361/679.04 |
| 5,887,373 A * | 3/1999 | Byers | ..................... | A47G 1/065 40/733 |
| 5,923,307 A * | 7/1999 | Hogle, IV | ........... | G06F 3/04897 345/1.3 |
| 6,144,358 A * | 11/2000 | Narayanaswamy | .. | G06F 1/1647 345/173 |
| 6,362,440 B1 * | 3/2002 | Karidis | ................. | G06F 1/1624 345/169 |
| 6,392,871 B1 * | 5/2002 | Yanase | .................... | G06F 1/162 345/905 |
| 6,643,124 B1 * | 11/2003 | Wilk | ................... | H04M 1/0247 345/169 |
| 6,700,773 B1 * | 3/2004 | Adriaansen | ........... | G06F 1/1643 361/679.08 |
| 6,819,304 B2 * | 11/2004 | Branson | ................ | G06F 1/1677 345/1.3 |
| 6,859,219 B1 * | 2/2005 | Sall | ........................ | G06F 1/1683 345/905 |
| 7,864,517 B2 * | 1/2011 | Miller | ................... | G06F 1/1618 345/1.1 |

(Continued)

OTHER PUBLICATIONS

Chen, J.J., Realizing Thin-Film Encapsulation's Benefits for Large-Scale OLED Panels, Frontline Technology, Mar./Apr. 2021, pp. 6-9, informationdisplay.org (4 pages).

(Continued)

*Primary Examiner* — Adrian S Wilson
(74) *Attorney, Agent, or Firm* — Brian J. Pangrle

(57) ABSTRACT

A foldable device can include a processor; memory accessible to the processor; a foldable frame that includes a hinge assembly that defines a folding axis offset from a center of the foldable frame; and a foldable display supported by the foldable frame and operatively coupled to the processor.

16 Claims, 16 Drawing Sheets

(56) References Cited

U.S. PATENT DOCUMENTS

| | | | | |
|---|---|---|---|---|
| 8,289,687 | B2* | 10/2012 | Weinstein | G06Q 30/02 |
| | | | | 455/575.4 |
| 8,605,421 | B2* | 12/2013 | Verschoor | G06F 1/1652 |
| | | | | 361/679.55 |
| 8,634,873 | B2* | 1/2014 | Jones | H04M 1/0247 |
| | | | | 455/66.1 |
| D741,856 | S* | 10/2015 | Yamazaki | D14/341 |
| 10,054,990 | B1 | 8/2018 | Harmon | |
| 10,180,704 | B1* | 1/2019 | Stewart | G06F 1/1652 |
| 10,244,088 | B2* | 3/2019 | Kikuchi | G06F 1/1686 |
| 10,524,033 | B2* | 12/2019 | Vatu | H05K 5/0226 |
| 10,645,329 | B2* | 5/2020 | Lai | G06F 3/013 |
| 11,392,190 | B2* | 7/2022 | Chang | G06F 1/3203 |
| 11,416,024 | B2* | 8/2022 | Bryant | G06F 1/1632 |
| 2002/0024499 | A1* | 2/2002 | Karidis | G06F 1/1626 |
| | | | | 345/156 |
| 2002/0109662 | A1* | 8/2002 | Miller | G06F 3/1431 |
| | | | | 345/100 |
| 2004/0012509 | A1* | 1/2004 | Chen | G06F 1/1669 |
| | | | | 361/679.17 |
| 2004/0108968 | A1* | 6/2004 | Finke-Anlauff | G06F 1/1616 |
| | | | | 345/1.1 |
| 2004/0190239 | A1* | 9/2004 | Weng | G06F 1/1669 |
| | | | | 361/679.2 |
| 2007/0062089 | A1* | 3/2007 | Homer | G06F 1/1626 |
| | | | | 40/754 |
| 2009/0034173 | A1* | 2/2009 | Shaum | G06F 1/1616 |
| | | | | 361/679.28 |
| 2010/0039764 | A1* | 2/2010 | Locker | G06F 1/1615 |
| | | | | 361/679.29 |
| 2011/0241998 | A1* | 10/2011 | McKinney | H04M 1/0247 |
| | | | | 345/204 |
| 2012/0002360 | A1* | 1/2012 | Seo | G09F 9/301 |
| | | | | 361/679.01 |
| 2012/0264489 | A1* | 10/2012 | Choi | G06F 1/1652 |
| | | | | 455/566 |
| 2013/0229100 | A1* | 9/2013 | Siddiqui | G06F 3/0202 |
| | | | | 248/688 |
| 2013/0229534 | A1* | 9/2013 | Panay | E05D 11/1064 |
| | | | | 348/207.1 |
| 2013/0229773 | A1* | 9/2013 | Siddiqui | H01H 13/704 |
| | | | | 248/688 |
| 2013/0342090 | A1* | 12/2013 | Ahn | G06F 1/1616 |
| | | | | 312/258 |
| 2014/0204519 | A1* | 7/2014 | Wu | G06F 1/1669 |
| | | | | 361/679.17 |
| 2014/0204520 | A1* | 7/2014 | Wu | G06F 1/1669 |
| | | | | 361/679.17 |
| 2015/0205560 | A1* | 7/2015 | Zhao | G06F 3/1423 |
| | | | | 345/1.1 |
| 2015/0378557 | A1* | 12/2015 | Jeong | H04M 1/0241 |
| | | | | 715/835 |
| 2016/0091929 | A1* | 3/2016 | Kwong | G06F 1/1692 |
| | | | | 345/173 |
| 2016/0215541 | A1* | 7/2016 | Tazbaz | E05D 7/00 |
| 2016/0291642 | A1* | 10/2016 | Kwak | G06F 1/1692 |
| 2016/0381014 | A1* | 12/2016 | Kim | G06F 1/1616 |
| | | | | 726/7 |
| 2017/0003714 | A1* | 1/2017 | Kwon | G06F 1/1615 |
| 2017/0102738 | A1* | 4/2017 | Park | G06F 3/04883 |
| 2018/0375975 | A1* | 12/2018 | Kikuchi | G06F 1/1652 |
| 2019/0011955 | A1* | 1/2019 | Stewart | G06F 1/1652 |
| 2019/0132542 | A1* | 5/2019 | Lai | G06F 3/013 |
| 2019/0335258 | A1* | 10/2019 | Vaturi | H04R 29/001 |
| 2019/0339738 | A1* | 11/2019 | Hou | G06F 1/1615 |
| 2021/0112673 | A1* | 4/2021 | Huttula | G06F 1/1641 |
| 2021/0271304 | A1* | 9/2021 | Chang | G06F 1/3203 |
| 2022/0163999 | A1* | 5/2022 | Perelli | G06F 1/1652 |

OTHER PUBLICATIONS

Cunningham, K., Foldable Phones Bend the Limits of Technology, Nanochip Fab Solutions, Applied Materials, Jul. 2019 (https://www.appliedmaterials.com/nanochip/nanochip-fab-solutions/july-2019/foldable-phones-bend-the-limits-of-technology) (8 pages).

Silvernail, J.A., et al., A new environmental barrier layer for organic light-emitting displays, IMID/IDMC/Asia Display 08 Digest (2008), pp. 1063-1064 (2 pages).

* cited by examiner

FOLDABLE DEVICE

TECHNICAL FIELD

Subject matter disclosed herein generally relates to technology for computing devices.

BACKGROUND

Various types of computing devices have one or more housings. For example, a tablet computing device (e.g., a tablet) can have a single housing with a display and a notebook computing device (e.g., a notebook) can have two housings where one of the housings is a display housing and the other one of the housings is a keyboard housing where the two housings are coupled by a hinge assembly.

SUMMARY

A foldable device can include a processor; memory accessible to the processor; a foldable frame that includes a hinge assembly that defines a folding axis offset from a center of the foldable frame; and a foldable display supported by the foldable frame and operatively coupled to the processor. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
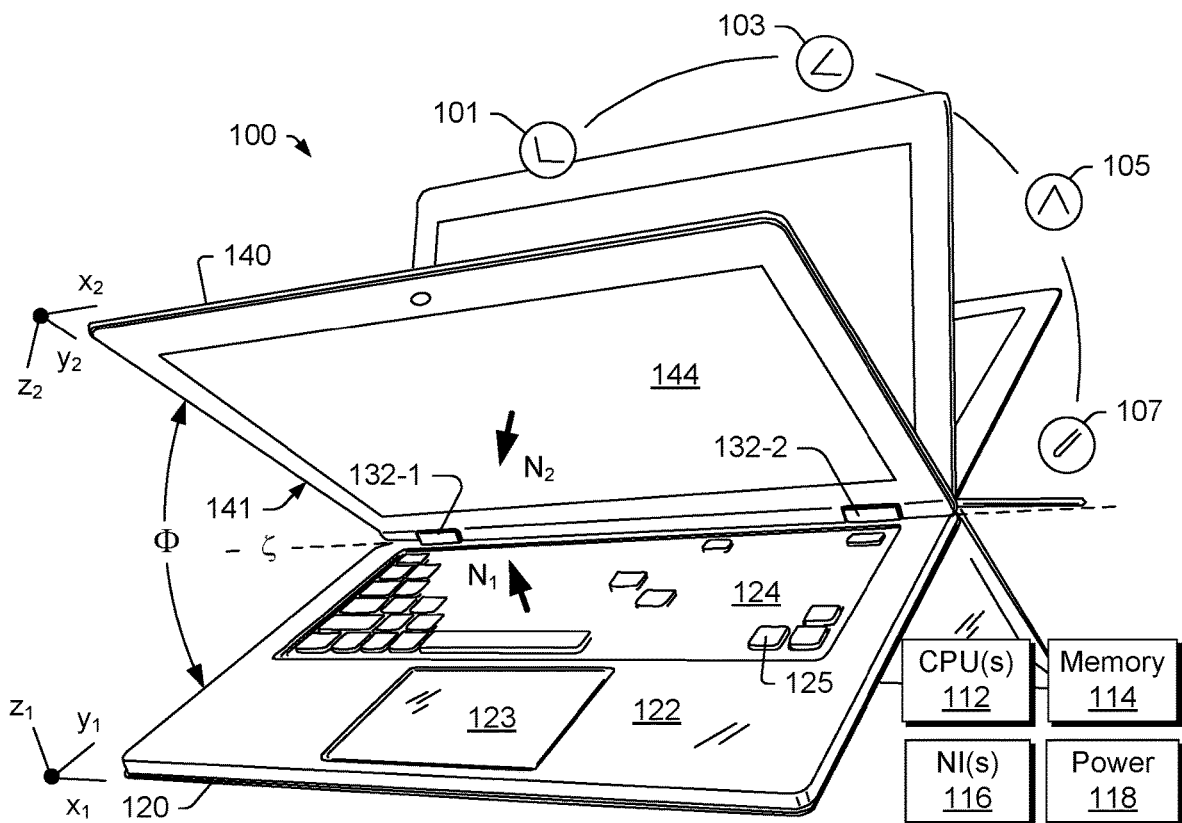
FIG. 1 is a series of diagrams of an example of a device.
Figure 1:
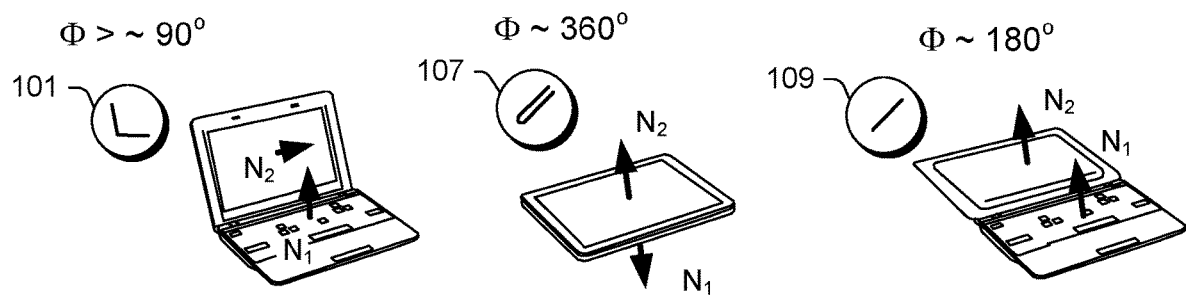

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a system such as, for example, a computing system (e.g., an information handling device, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 141 with a display surface 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 141 is defined in a second Cartesian coordinate system as having a width along an x-axis ($x_2$), a depth along a y-axis ($y_2$) and a height or thickness along a z-axis ($z_2$) that extends in a direction outwardly away from the viewing surface 144 of the display 141. As an example, a coordinate system may be right-handed or left-handed. In various examples, a footprint may be defined by an area such as an area in an x,y-plane.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 141 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 141 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 141 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 (e.g., normal to an $x_1,y_1$-plane) and a normal outward vector $N_2$ of the display 141 of the display housing 140 (e.g., normal to an $x_2,y_2$-plane) are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 141 of the display housing 140 are oriented in approximately the same pointing directions.

Various computing systems such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
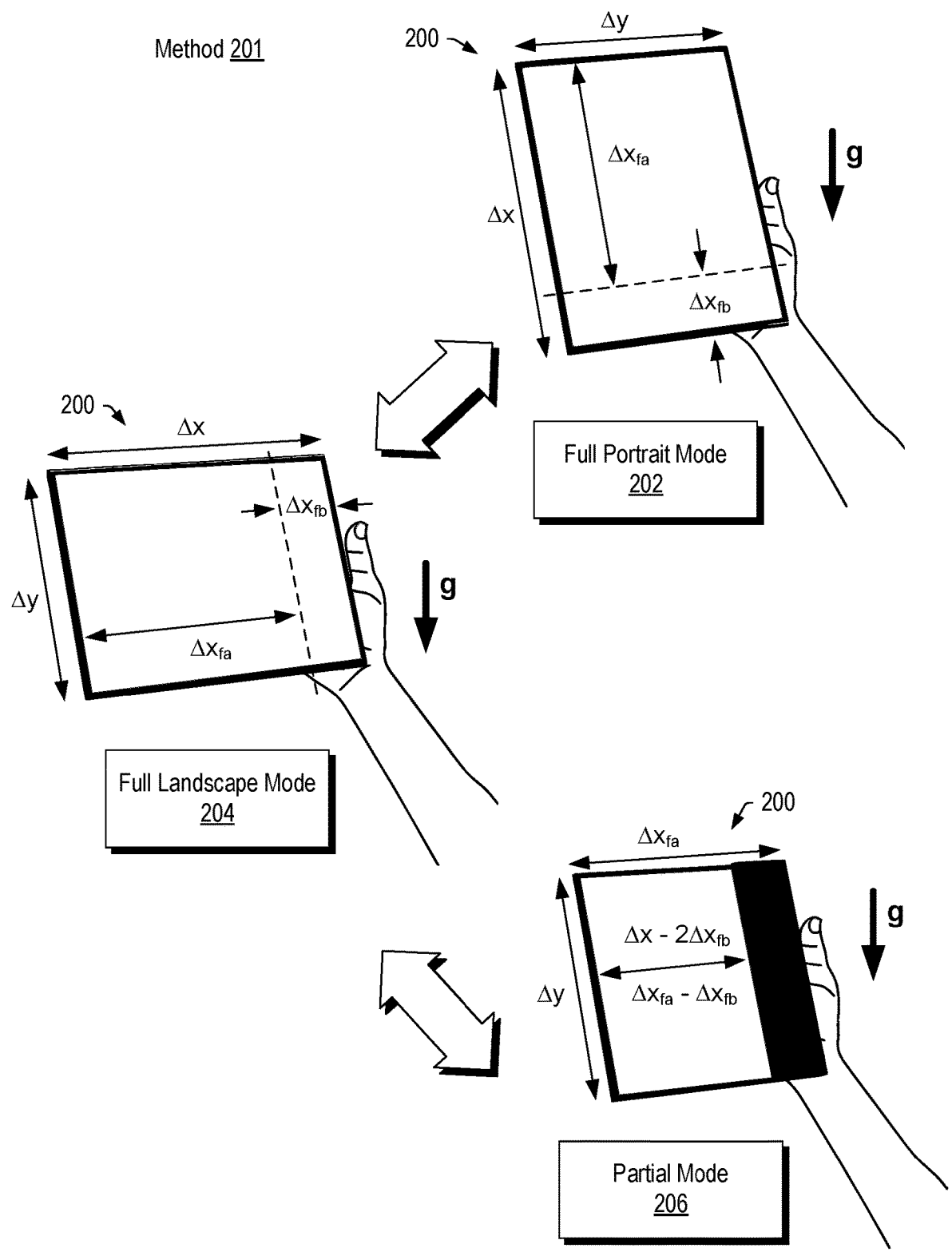
FIG. 2 is a series of diagrams of an example of a method for operation of a foldable device.

FIG. 2 shows an example of a foldable device 200, as an apparatus, with respect to an example of a method 201 where the foldable device 200 can be operated in different modes, for example, consider a full portrait mode 202, a full landscape mode 204 and a partial model 206; noting that the modes 202, 204 and 206 may correspond to one or more operational blocks that can be implemented using circuitry of the foldable device 200. As an example, the foldable device 200 may include one or more features of the device 100 of FIG. 1 (see, e.g., the one or more processors 112, the memory 114 (e.g., one or more memory devices), the one or more network interfaces 116, the one or more power cells 118, etc.). As an example, the foldable device 200 may be defined at least in part using planar portions and one or more normal vectors.

In the example of FIG. 2, the foldable device 200 can include a processor; memory accessible to the processor; a foldable frame that includes a hinge assembly that defines a folding axis offset from a center of the foldable frame; and a foldable display supported by the foldable frame and operatively coupled to the processor. In such an example, the memory may store processor executable instructions that can provide for operation of the foldable device 200 in one or more modes. As an example, the foldable device 200 can include one or more sensors that can provide signals that may be utilized in selecting a mode, transitioning from one mode to another mode, etc.

The foldable device 200 can be described using various coordinates such as, for example, an x coordinate and a y coordinate. As shown in the full portrait mode 202, the x coordinate is substantially oriented in a direction of gravity (e.g., acceleration of gravity) where a dimension Δx is greater than a dimension Δy of the foldable device 200. As shown via a dashed line, the foldable device 200 includes a single folding axis that extends edge to edge in a direction of the y coordinate. The folding axis can define portions of the foldable device 200, for example, consider a portion $\Delta x_{fa}$ to one side of the folding axis and another portion $\Delta x_{fb}$ to an opposite side of the folding axis. In the full landscape mode 204, the shorter dimension Δy is substantially oriented in a direction of gravity. In the partial mode 206, the portion $\Delta x_{fb}$ is folded over part of the portion $\Delta x_{fa}$ such that a viewable portion or visible portion suitable for rendering is less than an area of the portion $\Delta x_{fa}$. As shown the viewable portion can be represented as $\Delta x - 2\Delta x_{fb}$ or $\Delta x_{fa} - \Delta x_{fb}$. In the example of FIG. 2, the foldable device 200 in the partial mode is in a partial portrait mode as Δy is now the longer dimension and substantially oriented with respect to gravity.

In the example of FIG. 2, the foldable device 200 can be defined with respect to an aspect ratio or aspect ratios. For example, in the full modes 202 and 204, the aspect ratio is not 1:1 but rather a rectangular aspect ratio. And, in the partial mode 206, the viewable portion has an aspect ratio that is not 1:1 but rather a rectangular aspect ratio, while the foldable device 200 itself may have an aspect ratio that is 1:1 (e.g., square) or another aspect ratio. As to an aspect ratio of 1:1, the dimension $\Delta y$ may be equal to the dimension $\Delta x_{fa}$. Thus, as an example, a foldable device may be foldable to form a square from a rectangle (e.g., or vice versa).

As explained with respect to the example foldable device 200 of FIG. 2, a single folding axis that is offset from a centerline of the foldable device 200 can provide for swapping coordinates or sides that determine whether the foldable device 200 is in a portrait mode or a landscape mode. As explained, when full open, the dimension $\Delta x$ is longer, while, when closed, the dimension $\Delta y$ is longer. In the example method 201 of FIG. 2, one or more sensors may be utilized to determine an appropriate mode of operation of the foldable device 200 (see, e.g., FIG. 14).

Figure 3:
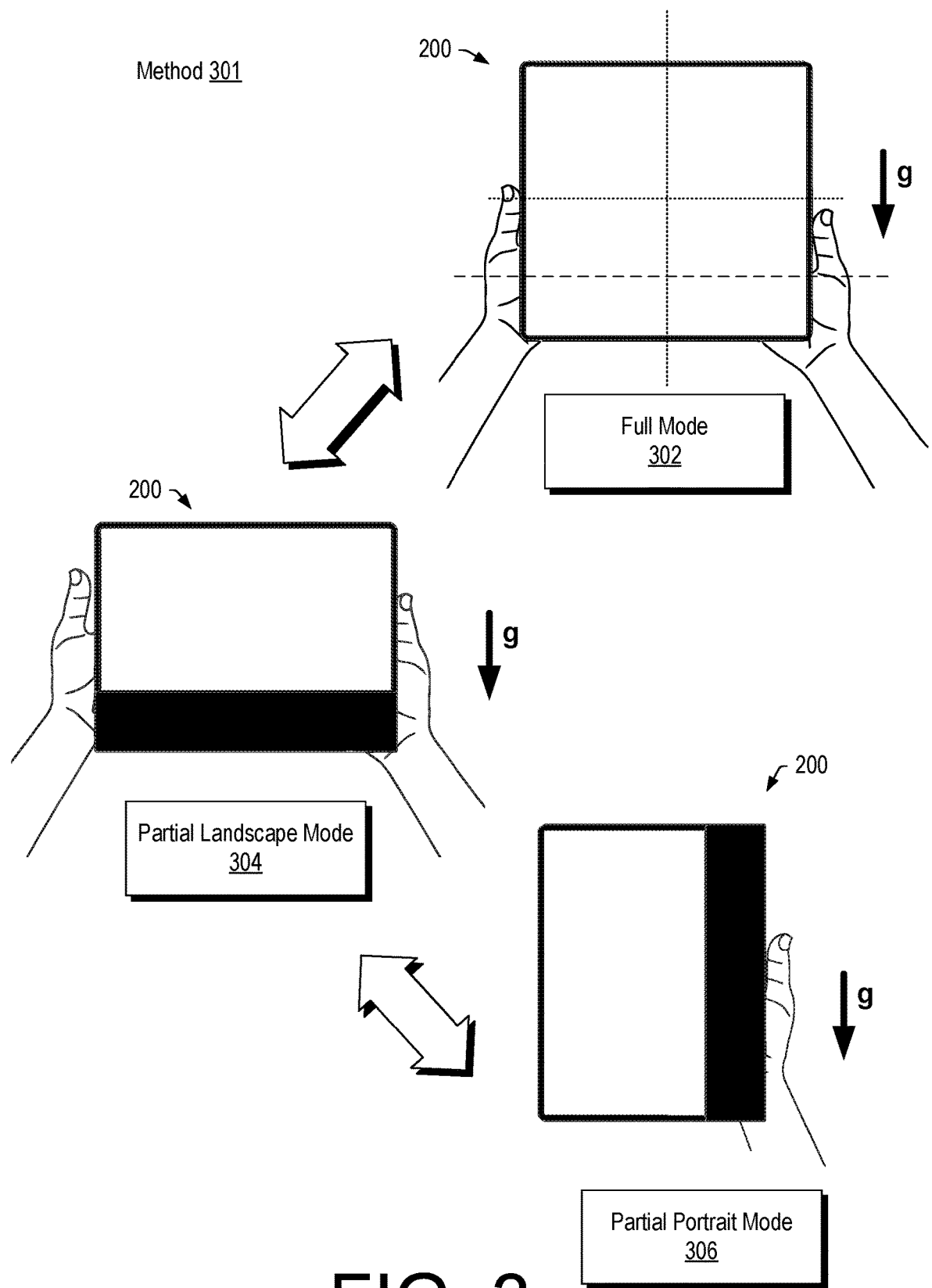
FIG. 3 is a series of diagrams of an example of a method for operation of a foldable device.

FIG. 3 shows an example of the foldable device 200 with respect to an example method 301 along with a full mode 302, a partial landscape mode 304 and a partial portrait mode 306; noting that the modes 302, 304 and 306 may correspond to one or more operational blocks that can be implemented using circuitry of the foldable device 200. In the example of FIG. 3, the foldable device 200 is square such that it may be defined by a 1:1 aspect ratio. As explained, a foldable device may be foldable to form a square from a rectangle or vice versa. In the example of FIG. 3, the foldable device 200 is square and can be folded via a single folding axis (see dashed line) that is offset from a centerline (see dotted lines) such that, once folded closed, the foldable device 200 is rectangular.

Figure 14:
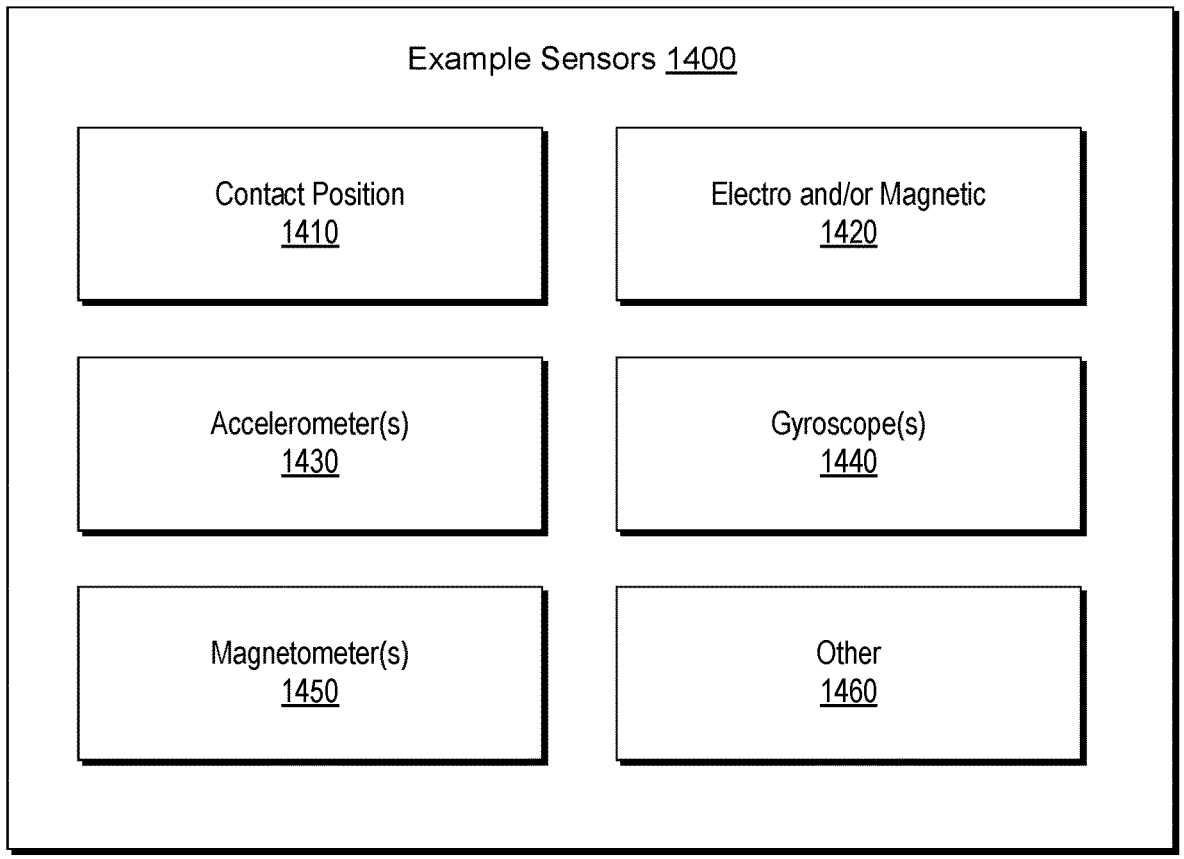
FIG. 14 is a block diagram of examples of sensors.

In the example of FIG. 3, the foldable device 200 can include one or more sensors that may be utilized to select an appropriate operational mode (see, e.g., FIG. 14). One or more sensors may be suitable for deciding whether a foldable device is full open, part open or closed and whether it is in a landscape orientation or a portrait orientation with respect to a fully or partially viewable foldable display; noting that a square (1:1 aspect ratio) can include a pseudo "landscape" and "portrait" orientations as one side can be determined to be an "up" side with respect to gravity. For example, in the full mode 302, it would be inappropriate to render to the foldable display with the left side being the "top"; rather the top side is appropriate to be the top (see, e.g., direction of gravity).

Figure 4:
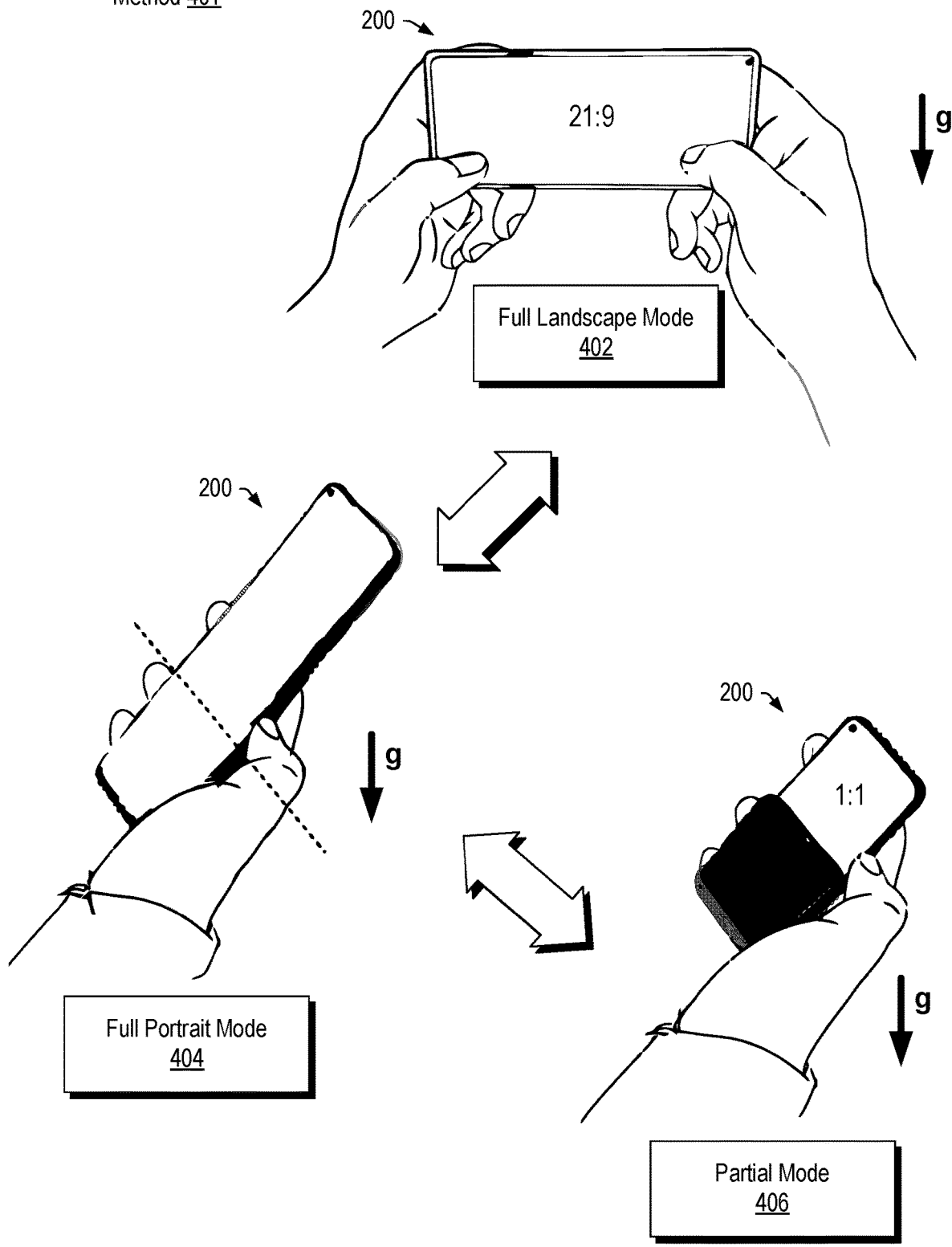
FIG. 4 is a series of diagrams of an example of a method for operation of a foldable device.

FIG. 4 shows an example of the folding device 200 with respect to a method 401 that includes a full landscape mode 402, a full portrait mode 404 and a partial mode 406; noting that the modes 402, 404 and 406 may correspond to one or more operational blocks that can be implemented using circuitry of the foldable device 200. In the example of FIG. 4, the folding device 200 may have an aspect ratio of approximately 21:9 when full open. The folding device 200, as mentioned, can include a single folding axis. As shown in the example of FIG. 4, the single folding axis provides for transitioning the foldable device 200 from a viewable foldable display with an approximately 21:9 aspect ratio to a partially viewable foldable display with an approximately 1:1 aspect ratio.

In the example of FIG. 4, the foldable device 200 may be utilized for various types of application in the mode 402 (e.g., gaming, entertainment, etc.). As an example, various controls may be rendered without blocking screen content (e.g., consider rendering along a lower portion of the foldable display). As to the mode 404, consider an ability to render more content such as keyboard that includes number graphics for dialing. Once a call is placed, a user may then transition the foldable device 200 to the more compact mode 406, which may be easier to hold, for example, while the user is walking, etc. Where the foldable device 200 is easier to hold (e.g., and/or balance in a hand), there can be a reduced risk of dropping, too much focus on holding the foldable device, etc. For example, with reduced risk of dropping a user may be less focused on holding the foldable device such that the user's attention can be more focused on an activity such as walking while the user may be, at the same time, in a conversation with another individual.

As an example, the mode 406 may be a more discrete mode. For example, consider an option to reduce screen brightness, reduce ringer/speaker volume, etc., in the mode 406. In such an example, when a user desires discreteness or not to disturb others, the mode 406 may provide for less distraction than, for example, one of the full modes 402 or 404. As an example, a foldable device may be controlled in a manner whereby an ambient control of display brightness differs in different modes. For example, in the full modes 402 and 404, display brightness may be at a higher level than in the mode 406, with or without ambient control. For example, consider two different ambient control settings where, in the mode 406, overall brightness is less than in the modes 402 and 404.

As an example, in the mode 406, the back side of the foldable device 200 that is now facing the user may include one or more features for receipt of input. For example, consider a touchpad that may include numbers that can be utilized for dialing. In such an example, when transitioned to one of the full modes 402 or 404, the touchpad may be deactivated (e.g., to avoid input of stray touches, etc.).

Figure 5:
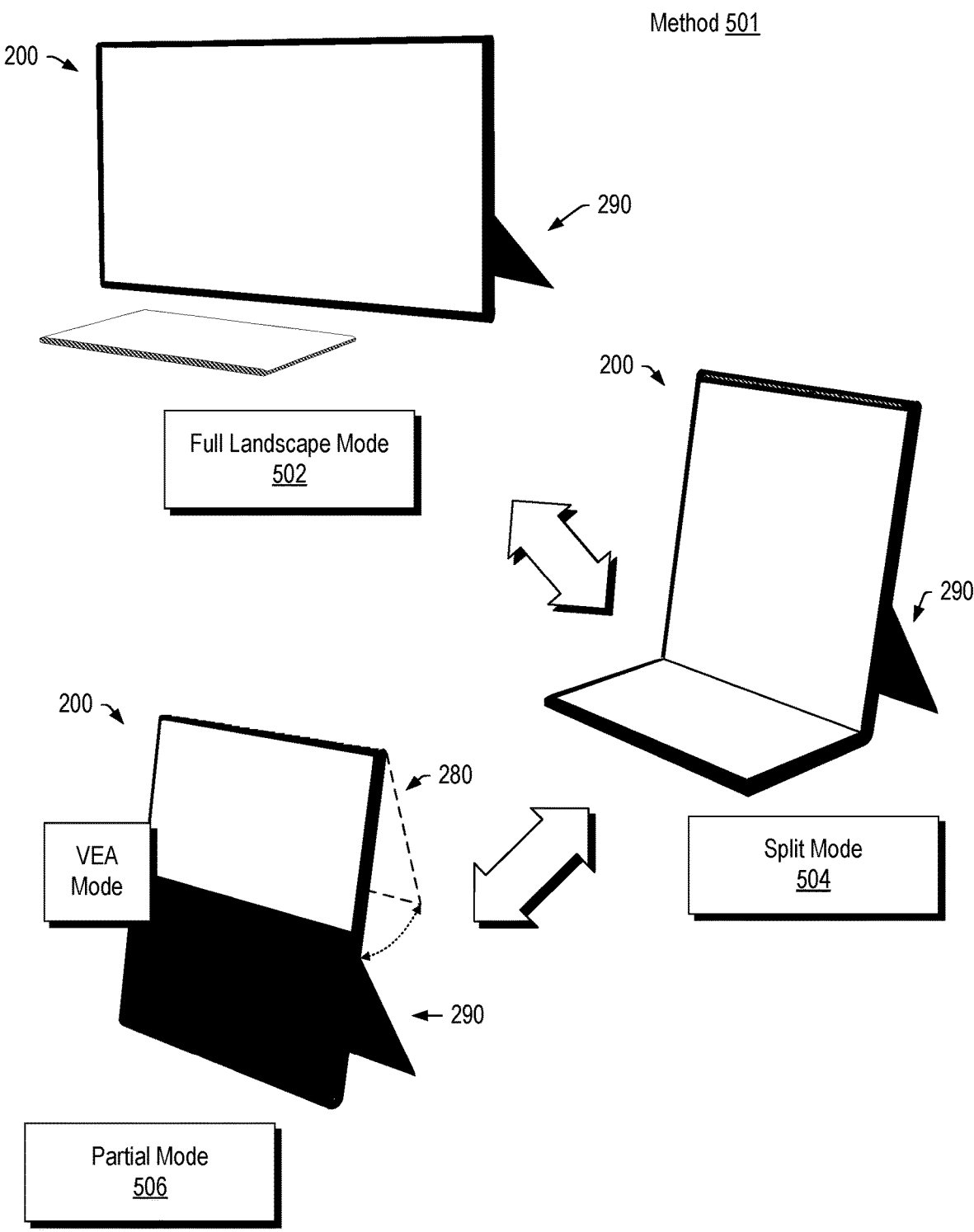
FIG. 5 is a series of diagrams of an example of a method for operation of a foldable device.

FIG. 5 shows an example of the foldable device 200 with respect to a method 501 that includes a full landscape mode 502, a split mode 504 (e.g., a split portrait mode) and a partial mode 506, which may be, for example, a voice enabled assistant mode (VEA mode). In such an example, a VEA mode may be triggered upon arrangement of the foldable device 200 as shown with respect to the partial mode 506. In FIG. 5, the modes 502, 504 and 506 may correspond to one or more operational blocks that can be implemented using circuitry of the foldable device 200.

In the example of FIG. 5, the foldable device 200 can include a display cover 280, which may be a full or a partial display cover. In the example of FIG. 5, the foldable device 200 can include a kickstand 290. As shown, the kickstand 290 can be a stick and/or a panel that can extend outwardly from a back side of the foldable device 200, for example, to help support the foldable device 200 on a tabletop, a desktop, a countertop, etc.

As shown in FIG. 5, with respect to the mode 506, the display cover 280 may fold over the back side and not interfere with the kickstand 290, while being able to fold over the front side to cover the viewable portion of the foldable display. In such an example, the foldable display may be completely covered, in part by folding of the foldable display along its folding axis and in part by the display cover. Such an approach can help to protect the foldable display, for example, when in storage, transport, etc.

Figure 6:
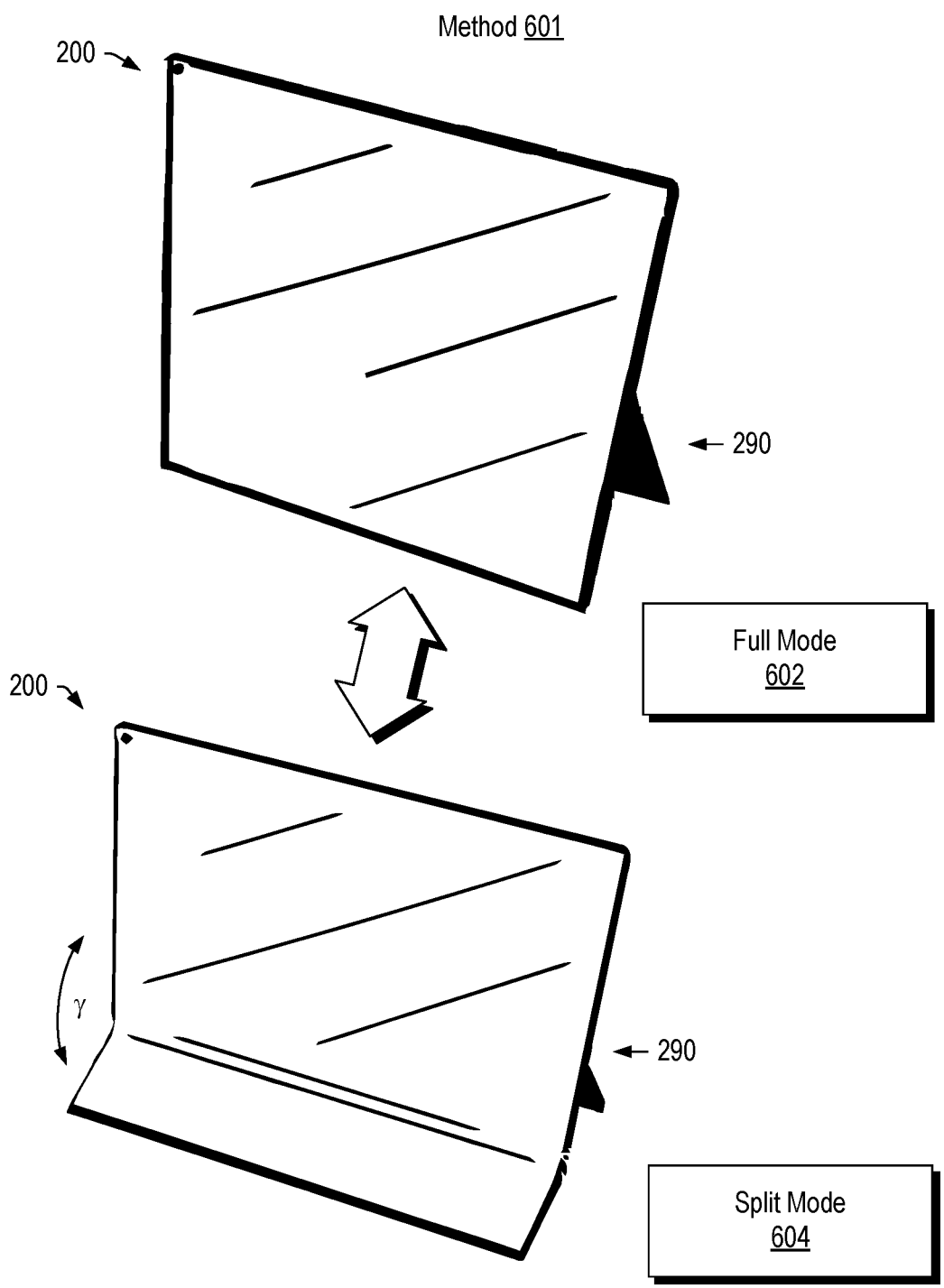
FIG. 6 is a series of diagrams of an example of a method for operation of a foldable device.

FIG. 6 shows an example of the foldable device 200 with respect to an example of a method 601, which includes a full mode 602 and a split mode 604; noting that the modes 602 and 604 may correspond to one or more operational blocks that can be implemented using circuitry of the foldable device 200. As shown in the example of FIG. 6, an angle γ may be defined between portions of the foldable device 200 where one portion is to one side of a folding axis and another portion is to another side of the folding axis.

In FIG. 6, the full mode 602 may be for a 1:1 aspect ratio where the split mode 604 can "split" the rendering to the foldable display such that certain content can be viewed in an aspect ratio that is other than 1:1 (e.g., a rectangular aspect ratio). In the split mode 604, the foldable display of the foldable device 200 may be split into a content portion and a control portion where, for example, the control portion may be substantially horizontal such that it can be touched by one or more fingers of a user while the user may rest her palms on a tabletop, a desktop, a countertop, etc. As an example, a control portion may render one or more controls (e.g., menus, video, audio, etc.). For example, consider the split mode 604 as operating the foldable device 200 as a video rendering device where video is rendered to a larger portion and where graphical controls for control of rendering of the video are rendered to a smaller portion. In such an example, the graphical controls, being rendered on the smaller portion which is not planar with the larger portion, may be less distracting to a user when the user is viewing the video rendered to the larger portion. Such an approach may provide for a user experience akin to a TV and remote control, for example, where video is rendered full screen to the larger portion (e.g., edge to edge of the larger portion).

Figure 7:
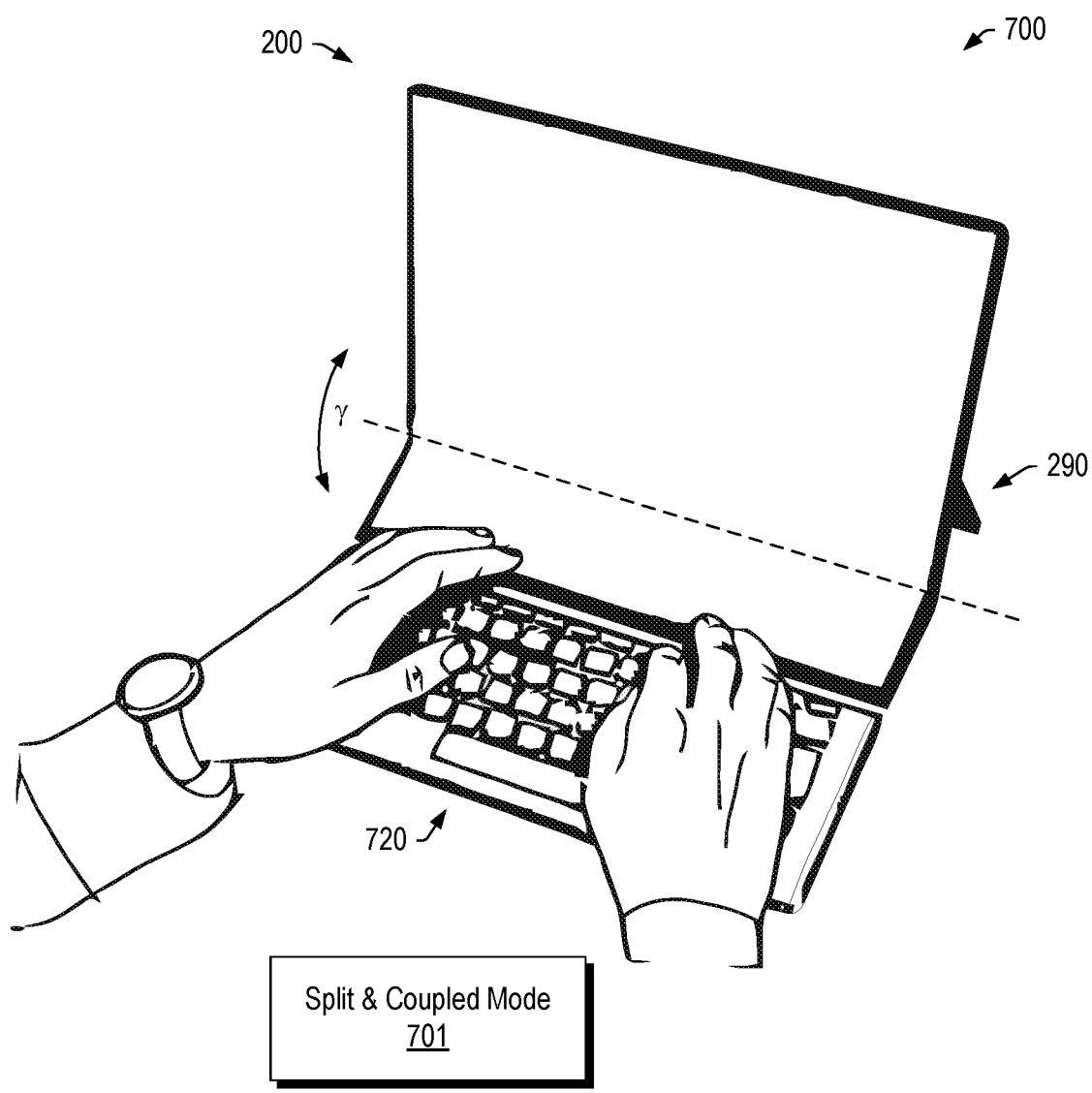
FIG. 7 is a diagram of an example of an assembly that includes an example of a foldable device.

FIG. 7 shows an example of an assembly 700 that includes an example of the foldable device 200 and an example of a keyboard housing 720 with a keyboard. As shown, the keyboard housing 720 can be positioned proximate to the foldable device 200 and optionally in contact with the foldable device 200. In the example of FIG. 7, a user may extend a finger or fingers past an end of the keyboard housing 720 to touch a portion of a foldable display of the foldable device 200 where, for example, the portion can include renderings of menus, buttons, keys (e.g., virtually extending functionality of the keyboard), etc.

In the example of FIG. 7, a split and coupled mode 701 is shown, which can be an operational block implemented using circuitry of the foldable device 200. For example, consider implementing the split and coupled mode 701 where a portion of a foldable display of the foldable device 200 is utilized for rendering particular graphical controls suitable for actuation via touch input. In such an example, an application may include one or more menus, controls, etc., that can be organized and rendered in a suitable manner. For example, a suitable manner may include rendering touchable graphical controls in one or more regions that correspond to longer fingers of the human hand (e.g., index, middle and ring fingers) as they may be positioned on a QWERTY standard keyboard where one or more of the longer fingers may be readily extended beyond an edge of the keyboard housing 720 to actuate one or more of the graphical controls.

As shown in the example of FIG. 7, an angle γ may be defined between portions of the foldable device 200 where one portion is to one side of a folding axis (see dashed line) and another portion is to another side of the folding axis. As an example, a foldable device may include a portion that can fold in one direction or in two directions. As to two directions, consider a portion that may be in a planar position where the portion may be folded in a clockwise direction or a counter-clockwise direction from the planar position with respect to a folding axis. In such an example, the portion may be folded closed, be viewable as a display or, for example, face downwardly for support (e.g., as a stand). As an example, the foldable device 200 as shown in FIG. 7 may include one or more sensors that can detect or otherwise determine an orientation of one or more portions of the foldable device 200, which may, for example, be utilized to cause the foldable device 200 to operate in a particular mode (e.g., selected from a plurality of different modes).

As an example, a foldable device can include one or more features to operatively couple to an accessory such as, for example, a keyboard. Such one or more features may include contact and/or contactless features (e.g., consider one or more wireless interfaces). As an example, a foldable device may connect to an accessory via one or more magnets, a key-keyway connector, etc. As an example, an accessory such as the keyboard housing 720 may provide for stabilizing the foldable device 200 in an orientation with or without the kickstand 290.

Figure 8:
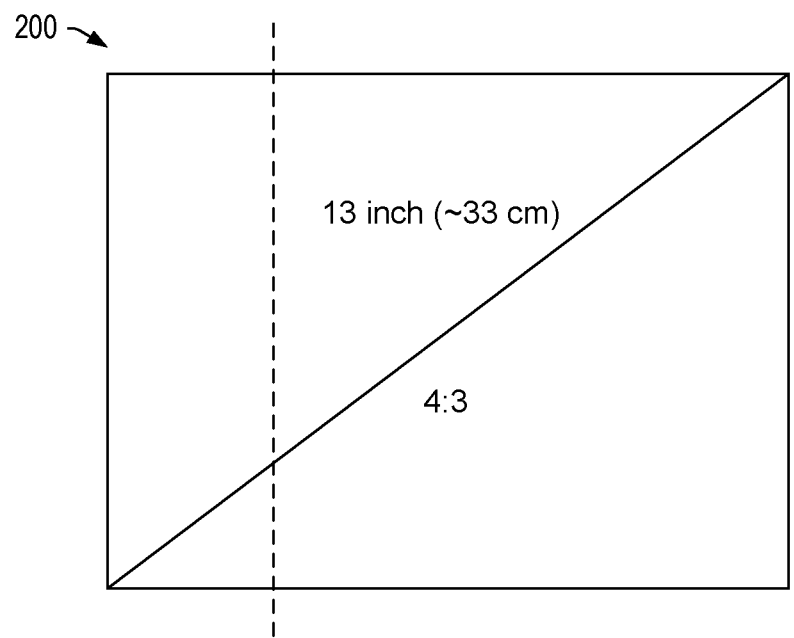
FIG. 8 is a diagram of an example of a foldable device.
Figure 8:
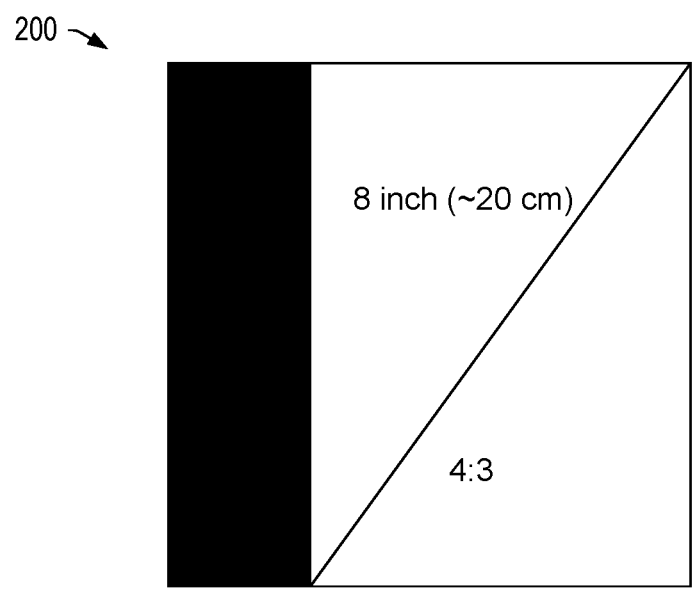

FIG. 8 shows an example of the foldable device 200 with examples of dimensions and aspect ratios. As shown, the foldable device 200 can be a 13 inch (e.g., approximately 33 cm) diagonal device with a 4:3 aspect ratio that can fold to provide a viewable portion of the foldable display that is 8 inch (e.g., approximately 20 cm) with a 4:3 aspect ratio. In the example of FIG. 8, the foldable device 200 can have a constant aspect ratio display, whether in a larger display area mode (e.g., full) or a smaller display area mode (e.g., partial).

Figure 9:
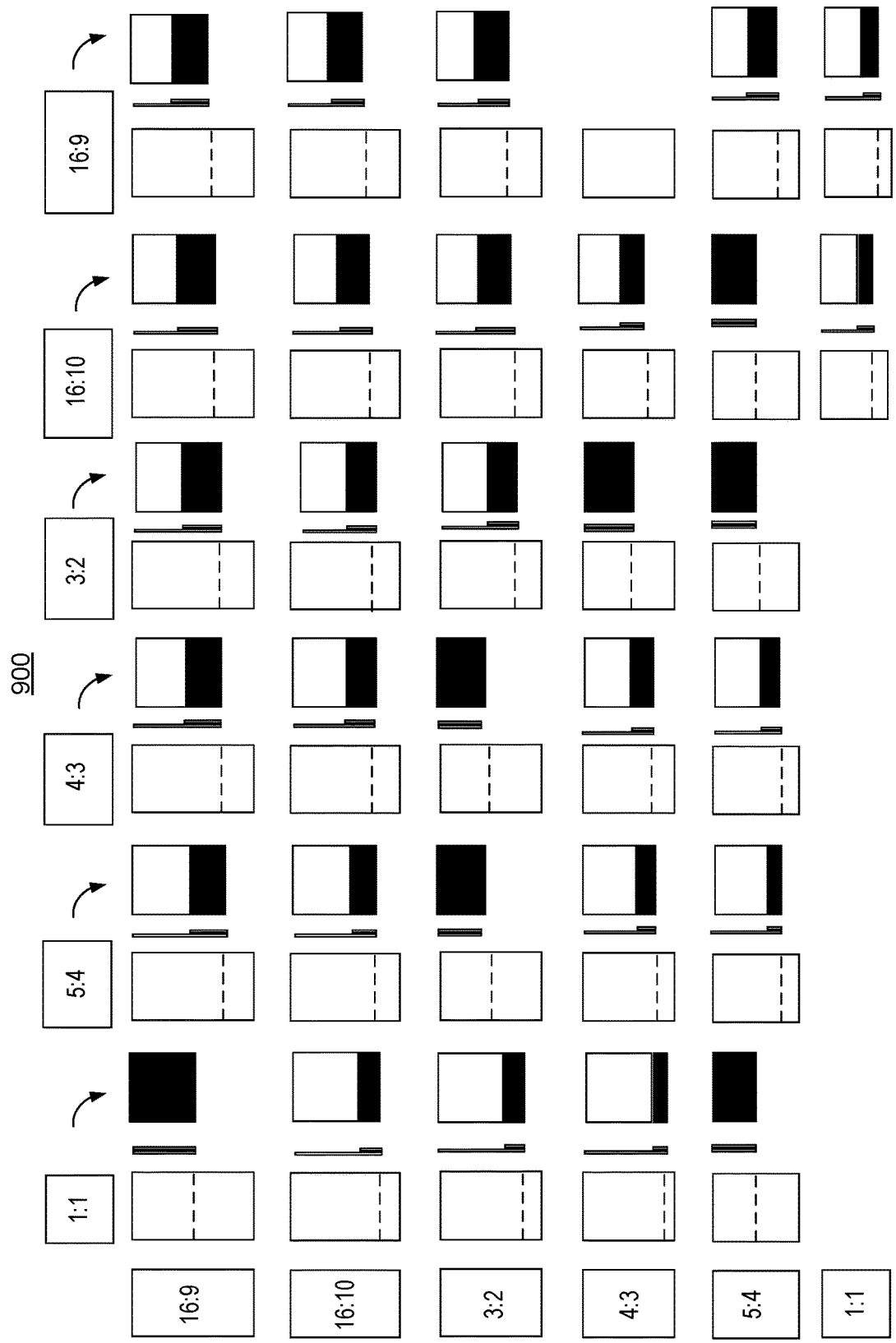
FIG. 9 is a diagram of an example of chart.

FIG. 9 shows an example chart 900 of examples of foldable display devices where some include a centerline folding axis and where others do not include a centerline folding axis. As shown, where a centerline folding axis is utilized, upon closing, there is no viewable portion of a folding display; whereas, where an offset folding axis (offset from a centerline) is utilized, upon closing, there is a viewable portion of a folding display. In the chart 900, some examples of aspect ratios are shown, including 1:1, 5:4, 4:3, 3:2, 16:10 and 16:9. Along the top row, the aspect ratios correspond to the viewable portion of the folding display when the foldable device is closed; whereas, along the first column, the aspect ratios correspond to the viewable folding display when the foldable device is full open.

As shown, when folded, a foldable device may be of a smaller form factor, which can help to facilitate holding, manipulating, storage, transport, etc. Once closed, a foldable device can include an active portion of a foldable display, which may consume less energy to power than the full foldable display. As an example, a foldable device can include power states where at least some of the power states may correspond to an active portion of a foldable display that is less than the full foldable display. As an example, a foldable device may be referred to as being asymmetric due to a folding axis being offset from a center or centerline of the foldable device. In such an example, once folded closed, an edge of the foldable device can be positioned across a portion of a foldable display such that another portion of the foldable display is viewable and active (e.g., or non-active when the foldable device is in a low power state such as wake-on, sleep, hibernate, etc.).

Figure 10:
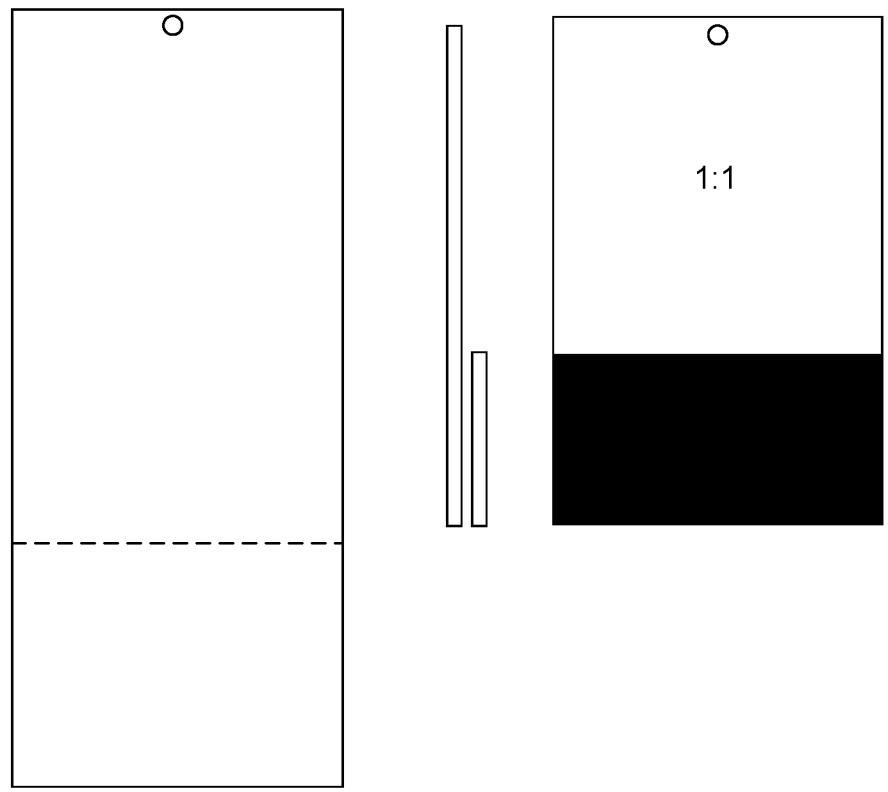
FIG. 10 is a diagram of an example of a foldable device.

FIG. 10 shows an example of the foldable device 200 for an aspect ratio of 21:9, where, upon closing, an aspect ratio of 1:1 is provided for viewing. In the example of FIG. 10, the foldable device 200 is more compact when closed yet provides for viewing information. As an example, the foldable device 200 may be operable for making a video call using one or more graphical controls rendered to its foldable display. For example, consider rendering features for placing a call where, once the call is placed (e.g., made), video may be rendered in a 1:1 aspect ratio portion such that the foldable device 200 may be folded closed while viewing video (e.g., live streaming video) of a call participant. In such an example, a user may hold the foldable device 200 using fingers where the fingers contact the foldable device 200 at least in part on or along the closed portion. In such an example, the user may avoid directly contacting the viewable portion of the foldable display, which may be touch-sensitive such that stray touches are not registered. As an example, the foldable device 200 can include a camera (see circle) that is positioned at or near an edge of the foldable device 200 that is of a larger portion of the foldable display. As shown, when folded closed, the camera can be utilized, for example, for a video call, etc. In various instances, a user may want to enlarge a field of view of a camera during a video call.

In the example of FIG. 10, the foldable device 200 may be a smartphone with cellular and/or satellite communication circuitry. In such an example, the foldable device 200 may have a longest dimension when open and planar of approximately 10 centimeters to approximately 30 centimeters where, once closed, a user may utilize a thumb and index finger to grip the foldable device 200 at the closed portion where, anatomically, the user can increase a distance between the camera and the user compared to holding the foldable device 200 in the user's palm (e.g., consider palm held being associated with an angled wrist position while a thumb-index finger grip may provide for an extended wrist position, thereby gaining several centimeters or more of distance between a user's face and the camera).

As an example, a back side of the foldable device 200 may include a material and/or material finish that provides for increased friction for gripping by a human hand. For example, consider a textured surface and/or a rubberized material that can increase a friction coefficient between a bare finger and/or a gloved finger and the foldable device 200. As an example, a frame of the foldable device 200 may include a stop mechanism that mechanically limits the closed position such that a user may apply force (e.g., gripping force) without a risk of damaging a foldable display of the foldable device.

As an example, an operating system of a foldable device can include one or more features for aspect ratio or aspect ratios. For example, consider a part open mode where one aspect ratio is applied to one portion of a foldable display and another aspect ratio is applied to another portion of the foldable display. Or, for example, consider a closed mode where an aspect ratio is applied to a part of a foldable display that is viewable.

As an example, consider the ANDROID operating system such as the ANDROID 10 OS where an application programming interface (API) provides for aspect ratio selection (e.g., 1:1, 4:3, 3:2, 16:10, 5:3, 16:9 and 21:9) and/or multi-screen programming and operational modes. As an example, an API level 29 or higher approach may be utilized that can support one or more aspect ratios, which can include larger aspect ratios (e.g., more than 16:9). Such an approach can help to ensure that an application (e.g., an app) can be sized and/or resized to fill a particular display, whether full or partial. And, as mentioned, where a part open mode is implemented, an approach may utilize an API's multi-window support, which may help provide a user with enhanced productivity and to manage multiple portions of a foldable display.

As explained, modes may include a monitor mode that may be an all-in-one (AIO) mode (see, e.g., mode 502 of FIG. 5), a touch bar mode (see, e.g., mode 504 of FIG. 5), a smart display mode (see, e.g., mode 506 of FIG. 5). As an example, an AIO mode may be for connection to one or more external devices for standalone use and/or functionality as a display where a fold may make the display smaller (e.g., to conserve space). As to a touch bar mode, consider a vertical viewing area of a portion of a foldable display that may be approximately the size of two 12 inch diagonal laptop displays (e.g., approximately 30.5 cm diagonal laptop displays), where a touch bar portion of the foldable display can provide touch and/or stylus accessibility. As to a smart display mode, consider a closed mode with a part of a foldable display being a 12 inch diagonal (e.g., approximately 30.5 cm diagonal) with a 16:9 aspect ratio. In such an example, a back side portion that faces frontward and that covers a portion of the foldable display may be available for expressive color, material and/or finish (CMF), a speaker grille, a low fidelity display/low power display area, a touch area, etc.

As explained, a foldable device may be substantially square with an aspect ratio of approximately 1:1 (e.g., plus or minus approximately 5 percent). For example, consider a 15 inch diagonal foldable display (e.g., approximately 38 cm diagonal foldable display) when full open that can be transitioned to a part open mode with two non-square portions and that can be transitioned to a closed mode with a non-square portion that may be approximately 12 inch diagonal (e.g., approximately 30.5 cm diagonal) and viewable with a 16:9 aspect ratio.

As explained, an assembly may include a keyboard housing that may be attachable and detachable from a foldable device. As an example, a foldable device may include a symmetric screen cover, which may be attachable and detachable (e.g., via magnetic force, etc.). As an example, a foldable device may include an asymmetric screen cover that can be utilized to cover a portion of a foldable display that is visible when the foldable device is in a closed position (e.g., as a portion of the foldable display is covered when folded).

As an example, a foldable device can include a kickstand that includes a hinge on a back side of the foldable device where the hinge is positioned at an approximate level of a bottom of a viewable portion of a foldable display when the foldable device is closed. In such an example, another hinge may be provided for a display cover (see, e.g., FIG. 5) that can be folded over the back side to the level of the hinge or folded over the front side to cover the viewable portion of the foldable display. In such an example, the display cover may not interfere with the kickstand while the kickstand can be hinged at a sufficiently high level for support of the foldable device.

As an example, a kickstand may be hinged to a foldable device frame and be hinged or foldable itself. For example, consider the example modes 602 and 604 of FIG. 6 where the kickstand 290 may be of variable length, being longer in the mode 602 and shorter in the mode 604, which may be accomplished via a hinge along the kickstand 290. As an example, a kickstand may be rotatable. For example, consider the kickstand 290 of FIG. 5, where it may be rotatable from one orientation as in the mode 502 to another orientation as in the modes 504 and/or 506.

As explained, a foldable device may be hand-holdable in one or more of full open, part open and closed modes. As an example, a foldable device may be hand-holdable and desktop supportable (e.g., desktop, tabletop, countertop, etc.) in one or more modes.

Figure 11:
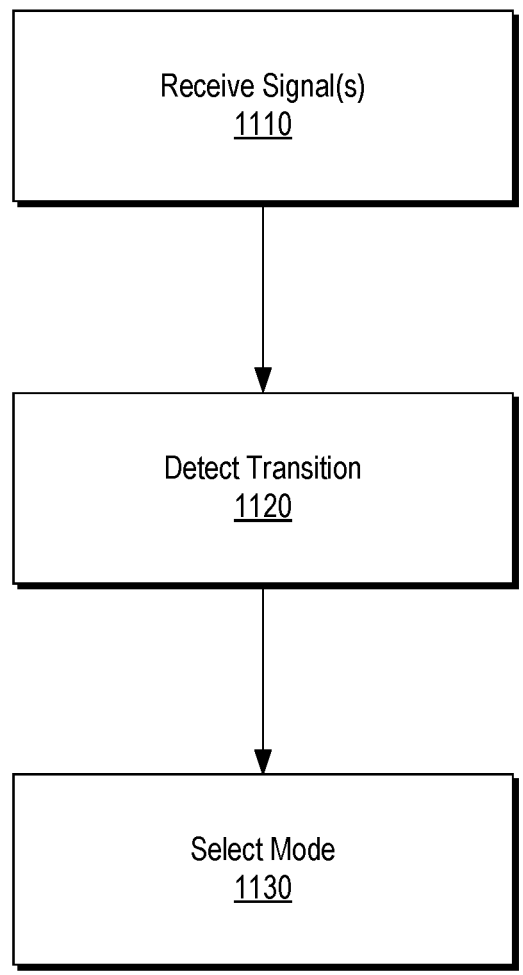
FIG. 11 is a block diagram of an example of a method.

FIG. 11 shows an example of a method 1100 that includes a reception block 1110 for receiving one or more signals (e.g., sensor data, etc.), a detection block 1120 for detecting a transition of a foldable device using at least one of the one or more signals, and a selection block 1130 for selecting a mode based at least in part on the detection of the transition.

Figure 12:
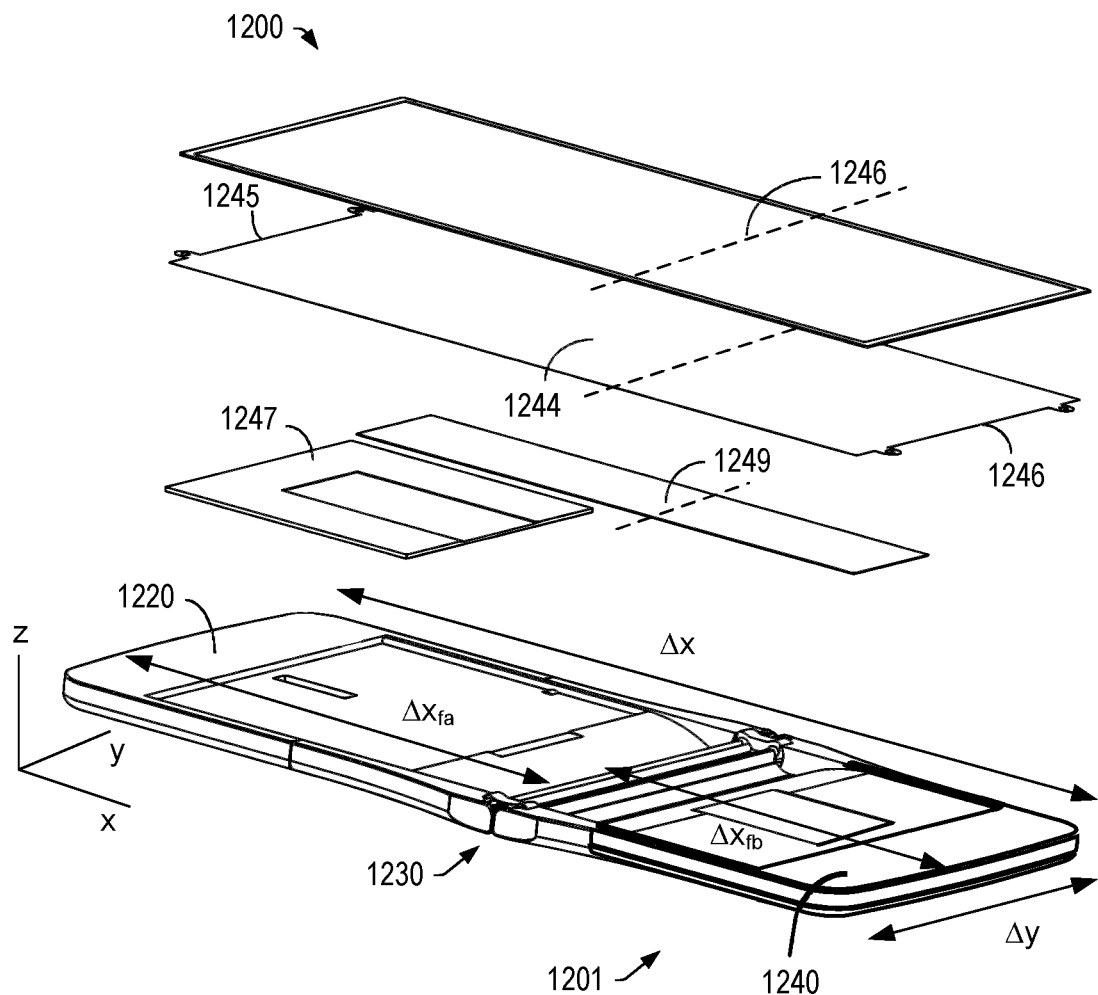
FIG. 12 is an exploded perspective view of an example of a foldable device.

FIG. 12 shows an exploded view of an example of a foldable device 1200 where the foldable device 1200 includes a foldable frame 1201 that includes a first device housing 1220 and a second device housing 1240 operatively coupled via a hinge assembly 1230. The foldable device 1200 includes a flexible display 1244, shown disposed beneath a flexible fascia 1246 where the flexible display 1244 spans the hinge assembly 1230 to define display portions 1245 and 1246 of the flexible display 1244. In the example of FIG. 12, the foldable device 1200 may include one or more trays 1247 and/or other guide mechanism, for example, to bias the flexible display 1244 to flatten the flexible display 1244 upon transition from a closed position to an open position of the first device housing 1220 with respect to the second device housing 1240 via the hinge assembly 1230. As an example, the foldable device 1200 can include one or more flexible circuits 1249, which may span the hinge assembly 1230.

As explained, the foldable device 1200 can include the foldable frame 1201 that includes the hinge assembly 1230 that defines a folding axis offset from a center of the foldable frame 1201 where the foldable display 1244 is supported by the foldable frame 1201 and operatively coupled to a processor (e.g., circuitry of the foldable device 1200). In such an example, the processor can control rendering of information to the foldable display 1244, for example, responsive to input received from one or more sensors to select an appropriate mode (e.g., an operational mode).

As shown in the example of FIG. 12, the foldable device 1200 has dimensions $\Delta x$ and $\Delta y$ where a visible area of the foldable display 1244 may be defined by $\Delta x$ and $\Delta y$ or, for example, the visible area of the foldable display 1244 may be slightly less than a footprint or area of the foldable device 1200. In the example of FIG. 12, the location of the hinge assembly 1230 can define a folding axis where the display portion 1245 can be to one side of the folding axis with a dimension $\Delta x_{fa}$ and where the display portion 1246 can be to an opposing side of the folding axis with a dimension $\Delta x_{fb}$. In a closed position, an area of the display portion 1245 can be visible (e.g., viewable) where the area is defined by $\Delta x_{fa}$ minus $\Delta x_{fb}$ or, for example, $\Delta x$ minus twice $\Delta x_{fb}$.

In the example of FIG. 12, the aspect ratio of the foldable display 1244 may be an aspect ratio selected from an aspect ratio shown in FIG. 10 and FIG. 11.

As an example, a display can be an organic light-emitting diode (OLED or organic LED) display. An OLED is a LED in which an emissive electroluminescent layer (or layers) is a film (of films) of organic compound(s) that emits light in response to an electric current. An organic layer can be situated between two electrodes where at least one is transparent.

Figure 13:
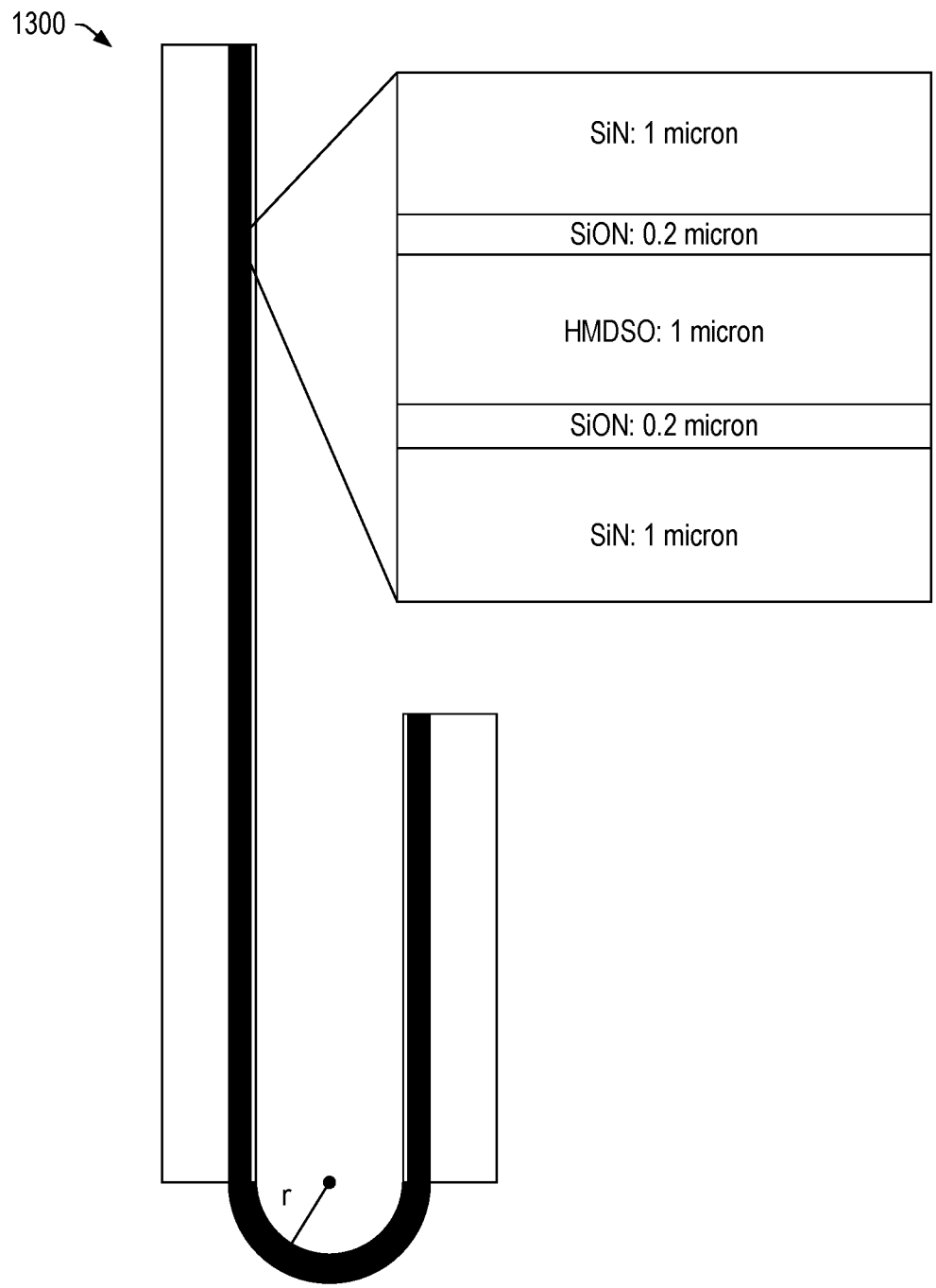
FIG. 13 is a diagram of an example of a foldable device.

FIG. 13 shows an example of a foldable device 1300 with some example layers and approximate thicknesses, which can include one or more SiN layers, one or more SiON layers and a hexamethyldisiloxane (HMDSO) layer. The SiN and/or SiON layers may be insulator layers. An OLED display includes an organic layer or layers that tend to be thin and based on chemically active materials, which may be damaged by exposure to moisture or oxygen. While a rigid OLED may be encapsulated with glass; however, as glass tends to be brittle, one or more other materials can be utilized for a foldable display. For example, consider OCA (optical clear adhesive) and a polarizer; noting that a thin flexible glass may be an option if available. In the example of FIG. 13, one or more other layers may include, for example, a cover window layer, one or more adhesive layers, one or more polarizer layers, one or more retarder layers, one or more filter layers, etc.

As an example, an OLED may utilize a transparent polyimide (PI) film where a hard coating can be applied top and bottom to compensate for the weak hardness. Transparent PI film for a cover window can be of a hardness of about 4H to 6H or more. As an example, an epoxy-siloxane hybrid hard coating transparent PI may be utilized. As an example, a PSA (pressure sensitive adhesive) may be utilized, for example, for pasting layers (e.g., may be used in about 4 or so layers in an OLED); noting that OCA is a type of PSA that can be used to attach a cover window and a polarizer.

For a foldable OLED display, a cover window and polarizer(s) tend to be the thickest and the closest to the exterior environment. A flexible OLED OCA may be about 100 microns to 150 microns thick; though techniques may provide for lowering the thickness to 100 microns or less. As to a polarizer, it acts to reduce reflection of external light, enhance outdoor visibility, and accurately represents black. A polarizer layer may be less than 150 microns in thickness (e.g., consider 100 microns or less).

In the example of FIG. 13, the foldable device 1300 can include a single folding axis where a bend radius can be defined be properties of the display, which can be a flexible and foldable OLED display. The foldable device 1300 may include one or more features of the foldable device 1200 of FIG. 12.

FIG. 14 shows some examples of sensors 1400 that may be utilized to detect position of a foldable device, which can include detection of orientation of the foldable device with respect to gravity and detection of position of portions of the foldable device with respect to a folding axis (e.g., open, closed, partially open, etc.). As shown in FIG. 14, a sensor or sensors can include one or more of a contact position sensor 1410, an electro and/or magnetic sensor 1420, an accelerometer 1430, a gyroscope 1440, a magnetometer 1450 and one or more other types of sensors 1460. As an example, a sensor may be a combination sensor that integrates multiple sensors. As an example, a device may include multiple sensors, which may be co-located and/or separately located. As an example, a device can include one or more sensors to one side of a folding axis and one or more sensors to another side of a folding axis. For example, consider the example of FIG. 7 where the angle $\gamma$ may be defined using a sensor to one side of the folding axis and another sensor to another side of the folding axis. In such an example, circuitry may receive signals from multiple sensors where such signals can determine a mode of operation for a device.

An accelerometer can be a sensor that measures changes in acceleration in one or more directions. An accelerometer can be affected by gravity. An accelerometer can be an inertial-frame sensor where, for example, in free fall, the acceleration is 0 m/s$^2$ in the falling direction and when positioned flat on a tabletop, acceleration in an upwards direction can be equal to Earth's gravity (g=9.8 m/s$^2$).

An accelerometer may measure linear acceleration which is the acceleration without gravity (e.g., gravity compensation) and/or may measure isolated gravity, for example, to discern a gravity vector (e.g., consider a gravity sensor). As accelerometers report acceleration, integration can provide velocity: $v=\int a \times \partial t$. And, to track position, consider: $x=\int v \times \partial t$. However, a double integral can amplify integral introduced drift.

As to a gyroscope, it can sense angular velocity, relative to itself, thus it measures its own rotation, using an inertial force (Coriolis effect). Gyroscopes oscillate at relative high frequency to measure inertial force and hence can consume more power than some other types of sensors. A gyroscope can be affected by vibrations, like a vibration (rumble) motor or speaker in the same device. To get rotation (angle) from a gyroscope, which senses angular velocity, consider a single integration: $\int \cos(2\pi \times ft)) = (1/(2\pi \times f)) \times \sin(2\pi \times ft)$, where "f" is frequency and "t" is time. As an example, an approach can multiply with ∂t such that error in reported time difference will manifest itself like the drift. Consider, for example: $\theta_n = \theta_{n-1} + \omega \times \partial t$ where ω denotes the angular velocity and θ, the resulting angle.

As to a magnetometer, it can sense magnetic field. As such, absent an artificial magnetic field, a magnetometer will sense the Earth's magnetic field (e.g., consider a general northerly direction, which may vary depending where on Earth the magnetometer is positioned). As an example, compensation may be applied where, for example, one or more components of a device are magnetized. Where artificial magnetization in surroundings is not moving, a magnetometer tends to provide stable measurements, sufficient to isolate gravity. As an example, a magnetometer may be a multiple axis sensor such that it outputs a multidimensional vector that points to a strongest magnetic field (e.g., does not enforce a specific device orientation to operate).

To determine an orientation of a device, the device can include one or more sensors that can generate a gravity vector. For example, consider a minimum of an accelerometer (e.g., with low pass filtering) and, for example, additionally a gyroscope if more precise readings are desired (e.g., consider tilt compensation).

As an example, a magnetometer may be part of a sensor fusion approach, for example, to generate an orientation sensor that is stationary to the Earth plane, or a compass (e.g., with corrections to declination depending on geolocation position, such that it points to the true north). As an example, a sum of multiple sensory inputs can increase stability of generated output (e.g., output signal(s)).

TABLE 1 below, shows some examples of fusion sensors.

| Sensor Type | Underlying Physical Sensors |
| --- | --- |
| Relative Orientation Sensor | Accelerometer and Gyroscope |
| Absolute Orientation Sensor | Accelerometer, Magnetometer, and (if present) Gyroscope |
| Geomagnetic Orientation Sensor | Accelerometer and Magnetometer |
| Gravity Sensor | Accelerometer and Gyroscope |
| Linear Acceleration Sensor | Accelerometer and either Gyroscope or Magnetometer |

As explained, a foldable device may be useable in one or more modes of operation, which may include modes associated with closed, open or partially open positions.

Figure 15:
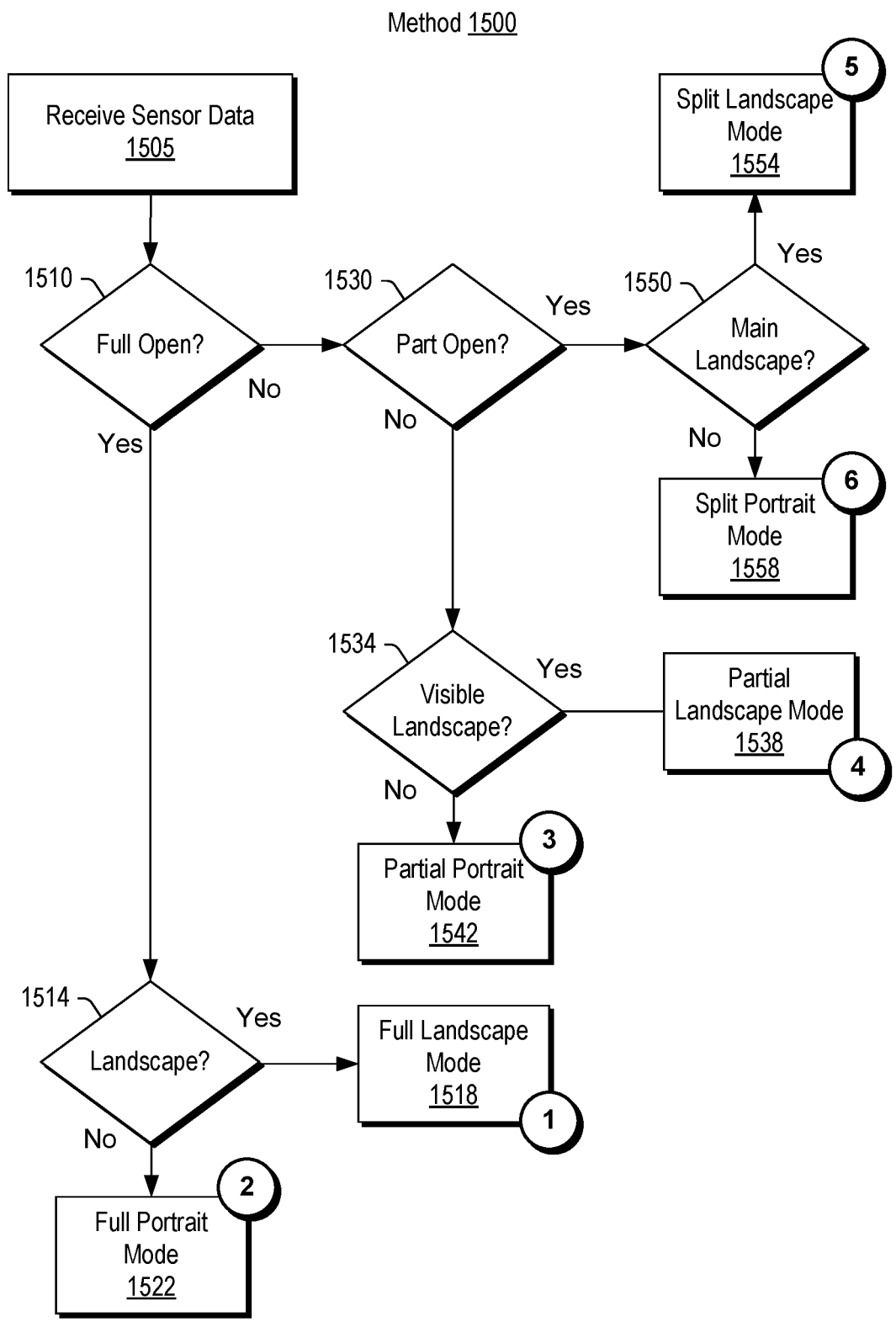
FIG. 15 is a block diagram of an example of a method.

FIG. 15 shows an example of a method 1500 that provides for decision making as to six different modes, for example, to determine how a foldable device is to operate with at least respect to rendering to at least one or more portions of a foldable display where, for example, the foldable display includes a single fold axis.

As shown in the example of FIG. 15, the method 1500 can include a reception block 1505 for receiving sensor data, which may include data from one or more sensors (see, e.g., FIG. 14) of a folding device with a foldable display, a decision block 1510 for deciding whether the folding device is full open, a decision block 1514 following a "yes" branch for deciding whether the full open foldable device is in a landscape orientation such that a full landscape mode block 1518 follows a "yes" branch and a full portrait mode block 1522 follows a "no" branch for setting the foldable device to an appropriate mode.

Referring again to the decision block 1510, following a "no" branch, the method 1500 can include a decision block 1530 for deciding whether the folding device is in part open where, following a "no" branch, the method 1500 can proceed to a decision block 1534 for deciding whether a visible portion (e.g., viewable portion) of the foldable display is in a landscape orientation such that a partial landscape mode block 1538 follows a "yes" branch and a partial portrait mode 1542 follows a "no" branch for setting the foldable device to an appropriate mode.

Referring again to the decision block 1530, following a "yes" branch, the method 1500 can proceed to a decision block 1550 for deciding whether a main portion of the foldable display is in a landscape orientation such that a split landscape mode block 1554 follows a "yes" branch and a split portrait mode follows a "no" branch for setting the foldable device to an appropriate mode.

As an example, a split mode can include rendering certain content to one portion of the foldable display and rendering certain other content to another portion of the foldable display. For example, consider the split portrait mode block 1558 where an electronic book format includes rendering a page to one portion and rendering notes, table of contents, etc., to another portion, optionally along with one or more messaging or communication panels. In such an example, a user may read a page of the book and track progress, see messages, etc., without disturbing rendering of the page. As to the split landscape mode block 1554, as mentioned, a foldable device may be utilized in a manner where a portion of a foldable display shows a menu or menus, which may be readily accessible for touch by one or more fingers of one or more hands of a user. As explained with respect to FIG. 7, in the split and coupled mode 701, a user may extend a finger or fingers past an end of a keyboard housing to touch a portion of a foldable display where, for example, the portion can include renderings of menus, buttons, keys (e.g., virtually extending functionality of the keyboard), etc.

As an example, where a foldable device is part open, it may be supported by itself in a portrait orientation and/or a landscape orientation where, for example, in the landscape orientation, depending on internal angle between portions of the foldable device, a kickstand may be utilized to help prevent tilting backward (e.g., the foldable device toppling backwards).

As an example, in a landscape orientation, a portion of a foldable device may be positioned underneath an edge of a keyboard housing where the keyboard housing may be of a sufficient mass to balance the foldable device such that it does not tip backwards. As an example, where an assembly or system includes a keyboard housing that can connect to a foldable device (e.g., via one or more magnets, etc.), it may help support the foldable device in an orientation as shown in the example of FIG. 7, with or without use of a kickstand.

As explained, a clamshell device that is symmetric does not provide for viewing of a display in a closed position; whereas, a foldable device with a folding display having a folding axis that is offset from a center or centerline can provide for a viewable portion when in a closed position, which may facilitate quick interactions and viewing of glanceable information. By folding a panel asymmetrically rather than in half, part of a display can remain viewable. As explained, an asymmetrically folding device (e.g., an "A-Sym" device) can transform from large to small easily and rapidly and remain useful, optionally without inclusion of a separate secondary display.

As an example, a foldable device can include a processor; memory accessible to the processor; a foldable frame that includes a hinge assembly that defines a folding axis offset from a center of the foldable frame; and a foldable display supported by the foldable frame and operatively coupled to the processor. In such an example, the foldable frame can be a rectangular foldable frame with one side longer than another or it may be a square foldable frame with its sides approximately equal (e.g., plus or minus 10 percent).

As an example, a folding axis can define a first portion of a foldable display and a smaller, second portion of the foldable display, where a combined display area of first portion and the second portion defines an aspect ratio and where a display area of the first portion minus twice a display area of the second portion has the same aspect ratio. In such an example, consider the aspect ratio as a 4:3 aspect ratio.

As an example, a foldable device can include a folding axis that defines a first portion of a foldable display and a second portion of the foldable display, where a display area of the first portion minus twice a display area of the second portion defines an aspect ratio of 1:1. In such an example, consider a combined display area of the first portion and the second portion as defining an aspect ratio of 21:9.

As an example, a folding device can include a folding axis that defines a first portion of a foldable display and a second portion of the foldable display, where a display area of the first portion minus twice a display area of the second portion defines an aspect ratio of 16:9.

As an example, a foldable device can include a foldable display that is a touch-sensitive foldable display. In such an example, the entire foldable display may be a touch-sensitive foldable display or a portion thereof may be a touch-sensitive display. As an example, where the foldable device includes various operational modes that can be associated with folded or unfolded positions, in one or more of the modes one or more portions of a foldable display that is touch-sensitive may be deactivated and/or activated. For example, consider the example of FIG. 10 where upon closing the foldable device 200 transitions from a 21:9 aspect ratio touch-sensitive area to a 1:1 aspect ratio touch-sensitive area. In various instances, touch sensing may be disabled for one or more portions of a foldable display. For example, consider a video call mode where once the call is connected and the foldable device folded closed, an exposed, viewable portion of a foldable display may be deactivated such that a user can carry the foldable device around without risk of having a touch sensed, which may end or otherwise distract from the call. In the example of FIG. 10, the 1:1 aspect ratio area may be "touch-deactivated" or otherwise "touch-ignored" such that the user can move around, walk, exercise, etc., while viewing a call participant via the viewable 1:1 aspect ratio area portion without worrying about a touch interrupting the call.

As an example, a foldable device can include an orientation detector (e.g., an orientation sensor, a sensor-dependent orientation detector, etc.). In such an example, the orientation detector can detect an orientation of the foldable device with respect to gravity. In such an example, responsive to a detection of change in the orientation of the foldable device with respect to gravity, the processor can change a display mode of the foldable display. In such an example, the display mode may be selected from a plurality of display modes that can include a landscape mode and a portrait mode.

As an example, a folding axis of a foldable device can define a first portion of a foldable display and a second portion of the foldable display and where an orientation detector detects an orientation of the first portion of the foldable display with respect to the second portion of the foldable display. For example, responsive to a detection of change in the orientation of first portion of the foldable display with respect to the second portion of the foldable display, a processor can change a display mode of the foldable display. In such an example, the display mode can be selected from a plurality of display modes that can include a full display mode and a partial display mode. As an example, a plurality of display modes can include a landscape partial display mode and a portrait partial display mode. As an example, a plurality of display modes can include a split display mode. For example, consider a split display mode that utilizes one of a first portion and a second portion as an input portion. In such an example, the input portion can include a menu region for receipt of touch input. As an example, a foldable device may be utilized with a keyboard housing that includes a keyboard, where the keyboard housing is positionable adjacent to an input portion of the foldable device (e.g., a menu region for receipt of touch input, etc.).

As an example, a foldable device can include a kickstand operatively coupled to a foldable frame of the foldable device. In such an example, a folding axis of the foldable device can define a first portion of the foldable frame and a second portion of the foldable frame, where the first portion is larger than the second portion, and where the kickstand is operatively coupled to the first portion.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 16:
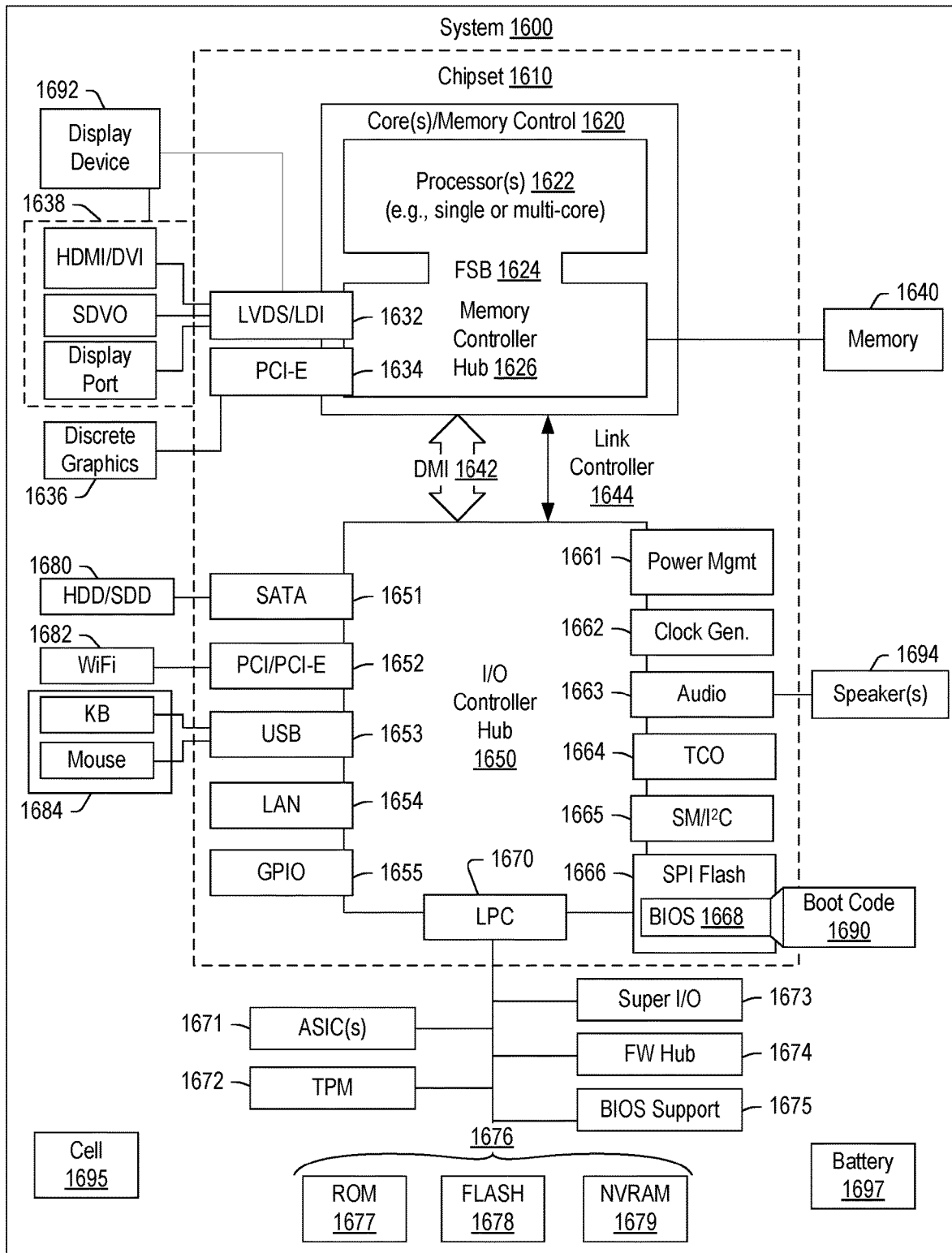
FIG. 16 is a diagram of an example of a system that includes one or more processors.

While various examples of circuits or circuitry have been discussed, FIG. 16 depicts a block diagram of an illustrative computer system 1600. The system 1600 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1600. As an example, one or more of the foldable device 200, etc., may include at least some of the features of the system 1600.

As shown in FIG. 16, the system 1600 includes a so-called chipset 1610. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 16, the chipset 1610 has a particular architecture, which may vary to some extent depending on brand or manufacturer. The architecture of the chipset 1610 includes a core and memory control group 1620 and an I/O controller hub 1650 that exchange information (e.g., data, signals, commands, etc.) via, for example, a direct management interface or direct media interface (DMI) 1642 or a link controller 1644. In the example of FIG. 16, the DMI 1642 is a chip-to-chip interface (sometimes referred to as being a link between a "northbridge" and a "southbridge").

The core and memory control group 1620 include one or more processors 1622 (e.g., single core or multi-core) and a memory controller hub 1626 that exchange information via a front side bus (FSB) 1624. As described herein, various components of the core and memory control group 1620 may be integrated onto a single processor die, for example, to make a chip that supplants the conventional "northbridge" style architecture.

The memory controller hub 1626 interfaces with memory 1640. For example, the memory controller hub 1626 may provide support for DDR SDRAM memory (e.g., DDR, DDR2, DDR3, etc.). In general, the memory 1640 is a type of random-access memory (RAM). It is often referred to as "system memory".

The memory controller hub 1626 further includes a low-voltage differential signaling interface (LVDS) 1632. The LVDS 1632 may be a so-called LVDS Display Interface (LDI) for support of a display device 1692 (e.g., a CRT, a flat panel, a projector, etc.). A block 1638 includes some examples of technologies that may be supported via the LVDS interface 1632 (e.g., serial digital video, HDMI/DVI, display port). The memory controller hub 1626 also includes one or more PCI-express interfaces (PCI-E) 1634, for example, for support of discrete graphics 1636. Discrete graphics using a PCI-E interface has become an alternative approach to an accelerated graphics port (AGP). For example, the memory controller hub 1626 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1650 includes a variety of interfaces. The example of FIG. 16 includes a SATA interface 1651, one or more PCI-E interfaces 1652 (optionally one or more legacy PCI interfaces), one or more USB interfaces 1653, a LAN interface 1654 (more generally a network interface), a general purpose I/O interface (GPIO) 1655, a low-pin count (LPC) interface 1670, a power management interface 1661, a clock generator interface 1662, an audio interface 1663 (e.g., for speakers 1694), a total cost of operation (TCO) interface 1664, a system management bus interface (e.g., a multi-master serial computer bus interface) 1665, and a serial peripheral flash memory/controller interface (SPI Flash) 1666, which, in the example of FIG. 16, includes BIOS 1668 and boot code 1690. With respect to network connections, the I/O hub controller 1650 may include integrated gigabit Ethernet controller lines multiplexed with a PCI-E interface port. Other network features may operate independent of a PCI-E interface.

The interfaces of the I/O hub controller 1650 provide for communication with various devices, networks, etc. For example, the SATA interface 1651 provides for reading, writing or reading and writing information on one or more drives 1680 such as HDDs, SDDs or a combination thereof. The I/O hub controller 1650 may also include an advanced host controller interface (AHCI) to support one or more drives 1680. The PCI-E interface 1652 allows for wireless connections 1682 to devices, networks, etc. The USB interface 1653 provides for input devices 1684 such as keyboards (KB), one or more optical sensors, mice and various other devices (e.g., microphones, cameras, phones, storage, media players, etc.). On or more other types of sensors may optionally rely on the USB interface 1653 or another interface (e.g., $I^2C$, etc.). As to microphones, the system 1600 of FIG. 16 may include hardware (e.g., audio card) appropriately configured for receipt of sound (e.g., user voice, ambient sound, etc.).

In the example of FIG. 16, the LPC interface 1670 provides for use of one or more ASICs 1671, a trusted platform module (TPM) 1672, a super I/O 1673, a firmware hub 1674, BIOS support 1675 as well as various types of memory 1676 such as ROM 1677, Flash 1678, and non-volatile RAM (NVRAM) 1679. With respect to the TPM 1672, this module may be in the form of a chip that can be used to authenticate software and hardware devices. For example, a TPM may be capable of performing platform authentication and may be used to verify that a system seeking access is the expected system.

The system 1600, upon power on, may be configured to execute boot code 1690 for the BIOS 1668, as stored within the SPI Flash 1666, and thereafter processes data under the control of one or more operating systems and application software (e.g., stored in system memory 1640). An operating system may be stored in any of a variety of locations and accessed, for example, according to instructions of the BIOS 1668. Again, as described herein, a satellite, a base, a server or other machine may include fewer or more features than shown in the system 1600 of FIG. 16. Further, the system 1600 of FIG. 16 is shown as optionally include cell phone circuitry 1695, which may include GSM, CDMA, etc., types of circuitry configured for coordinated operation with one or more of the other features of the system 1600. Also shown in FIG. 16 is battery circuitry 1697, which may provide one or more battery, power, etc., associated features (e.g., optionally to instruct one or more other components of the system 1600). As an example, a SMBus may be operable via a LPC (see, e.g., the LPC interface 1670), via an $I^2C$ interface (see, e.g., the SM/$I^2C$ interface 1665), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A foldable device comprising:
   a processor;
   memory accessible to the processor;
   an orientation detector;
   a foldable frame that comprises a hinge assembly that defines a folding axis offset from a center of the foldable frame;
   a foldable display supported by the foldable frame and operatively coupled to the processor, wherein the folding axis defines a first portion of the foldable display and a smaller, second portion of the foldable display; and circuitry that, responsive to an orientation signal of the orientation detector that indicates that the second portion of the foldable display is facing and covering part of the first portion of the foldable display, changes from a landscape display mode for landscape rendering to a full display area of the foldable display to a portrait partial display mode for portrait rendering to an uncovered part of the first portion of the foldable display.

2. The foldable device of claim 1, wherein the foldable frame comprises a rectangular foldable frame.

3. The foldable device of claim 1, wherein the foldable frame comprises a square foldable frame.

4. The foldable device of claim 1, wherein a combined display area of first portion and the second portion is equal to the full display area and defines an aspect ratio and wherein the full display area minus twice a display area of the second portion has the same aspect ratio.

5. The foldable device of claim 4, wherein the aspect ratio is 4:3.

6. The foldable device of claim 1, wherein the full display area minus twice a display area of the second portion defines an aspect ratio of 1:1.

7. The foldable device of claim 6, wherein a combined display area of the first portion and the second portion is equal to the full display area and defines an aspect ratio of 21:9.

8. The foldable device of claim 1, wherein the full display area minus twice a display area of the second portion defines an aspect ratio of 16:9.

9. The foldable device of claim 1, wherein the foldable display comprises a touch-sensitive foldable display.

10. The foldable device of claim 1, wherein the orientation detector detects an orientation of the foldable device with respect to gravity and wherein, responsive to a detection of change in the orientation of the foldable device with respect to gravity, the circuitry changes a from the partial portrait mode that renders to the part of the first portion of the foldable display to a partial landscape mode to a partial landscape mode that renders to the part of the first portion of the foldable display.

11. The foldable device of claim 1, comprising a split display mode.

12. The foldable device of claim 11, wherein the split display mode utilizes one of the first portion and the second portion as an input portion.

13. The foldable device of claim 12, wherein the input portion comprises a menu region for receipt of touch input.

14. The foldable device of claim 12, comprising a keyboard housing that comprises a keyboard, wherein the keyboard housing is positionable adjacent to the input portion.

15. The foldable device of claim 1, comprising a kickstand operatively coupled to the foldable frame, wherein the folding axis defines a first portion of the foldable frame and a second portion of the foldable frame, wherein the first portion is larger than the second portion, and wherein the kickstand is operatively coupled to the first portion.

16. A foldable device comprising:
a processor;
memory accessible to the processor;
an orientation detector;
a foldable frame that comprises a hinge assembly that defines a folding axis offset from a center of the foldable frame; and
a foldable display supported by the foldable frame and operatively coupled to the processor,
wherein the folding axis defines a first portion of the foldable display and a second portion of the foldable display and wherein the orientation detector detects an orientation of the first portion of the foldable display with respect to the second portion of the foldable display,
wherein, responsive to a detection of change in the orientation of the first portion of the foldable display with respect to the second portion of the foldable display, the processor changes a display mode of the foldable display,
wherein the display mode is selected from a plurality of display modes that comprises a full display mode and a partial display mode, and wherein the plurality of display modes comprises a landscape partial display mode and a portrait partial display mode.

* * * * *